United States Patent
Inoue et al.

(10) Patent No.: US 9,254,493 B2
(45) Date of Patent: Feb. 9, 2016

(54) OXYGEN-ENRICHED AIR PRODUCING DEVICE AND OXYGEN-ENRICHED AIR PRODUCING METHOD

(75) Inventors: Kenichi Inoue, Kobe (JP); Takashi Hase, Kobe (JP); Shingo Kasai, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 343 days.

(21) Appl. No.: 14/003,700

(22) PCT Filed: May 8, 2012

(86) PCT No.: PCT/JP2012/003003
§ 371 (c)(1),
(2), (4) Date: Sep. 6, 2013

(87) PCT Pub. No.: WO2012/157204
PCT Pub. Date: Nov. 22, 2012

(65) Prior Publication Data
US 2014/0013950 A1 Jan. 16, 2014

(30) Foreign Application Priority Data

May 19, 2011 (JP) ................................ 2011-112342

(51) Int. Cl.
*B03C 1/00* (2006.01)
*B01D 53/22* (2006.01)
(Continued)

(52) U.S. Cl.
CPC . *B03C 1/00* (2013.01); *B01D 53/22* (2013.01); *B01D 57/02* (2013.01); *C01B 13/0248* (2013.01)

(58) Field of Classification Search
CPC ..... G06F 17/21; G06F 17/273; G06F 17/274; G06F 17/275; G06F 17/28; G10L 15/26; B01D 53/22; B01D 57/02; B03C 1/00; C01B 13/0248
See application file for complete search history.

(56) References Cited

U.S. PATENT DOCUMENTS

| 3,942,975 A * | 3/1976 | Drummond ............. C22B 4/005 |
| | | 204/164 |
| 2001/0045121 A1* | 11/2001 | Chiba .................... G01N 27/74 |
| | | 73/25.02 |

(Continued)

FOREIGN PATENT DOCUMENTS

| CN | 101054164 A | 10/2007 |
| JP | 55-070302 | 5/1980 |

(Continued)

OTHER PUBLICATIONS

International Search Report from Japanese Patent Office in corresponding International Application No. PCT/JP2012/003003, mailed Aug. 21, 2012, pp. 1-2 and the Written Opinion of the International Searching Authority from the Japanese Patent Office, mailed Aug. 21, 2012, pp. 1-5.

(Continued)

*Primary Examiner* — Christopher P Jones
(74) *Attorney, Agent, or Firm* — Studebaker & Brackett PC

(57) ABSTRACT

The invention is characterized in: forming a magnetic field inside a flow channel tube, the tube wall of which is formed from a material that is nonmagnetic and which, when the pressure outside the flow channel tube is lower than the pressure inside the flow channel tube, passes a portion of the air flowing inside the tube through the tube wall and discharges same to the outside thereof; supplying air to the flow channel tube so that at least a region of laminar flow is formed inside the flow channel tube; and reducing the pressure outside the flow channel tube to a prescribed pressure.

13 Claims, 14 Drawing Sheets

(51) Int. Cl.
*B01D 57/02* (2006.01)
*C01B 13/02* (2006.01)

(56) References Cited

U.S. PATENT DOCUMENTS

| | | | |
|---|---|---|---|
| 2010/0066355 A1* | 3/2010 | Krause | G01D 18/00 324/228 |
| 2011/0011159 A1* | 1/2011 | Muller | G01N 27/74 73/25.02 |
| 2012/0203529 A1* | 8/2012 | Gaskin | G01N 27/74 703/9 |

FOREIGN PATENT DOCUMENTS

| | | |
|---|---|---|
| JP | 55-70302 A | 5/1980 |
| JP | 63-107802 A | 5/1988 |
| JP | 63-242319 A | 10/1988 |
| JP | 1-258723 | 10/1989 |
| JP | 1-258723 A | 10/1989 |
| JP | 5-309224 | 11/1993 |
| JP | 5-309224 A | 11/1993 |
| JP | 10-218603 | 8/1998 |
| JP | 2002-220208 A | 8/2002 |
| JP | 2004-049998 | 2/2004 |
| JP | 2004-49998 A | 2/2004 |
| JP | 2006-083807 | 3/2006 |
| JP | 2006-83807 A | 3/2006 |

OTHER PUBLICATIONS

Office Action issued from the Japanese Patent Office in corresponding Japanese Patent Application No. 2012-089129, dated Aug. 21, 2012, pp. 1-4 in Japanese and pp. 1-4 in its English translation.

* cited by examiner x-AXIS: TUBE AXIS
a: RADIUS OF FLOW CHANNEL TUBE
u: FLOW VELOCITY

OXYGEN-ENRICHED AIR PRODUCING DEVICE AND OXYGEN-ENRICHED AIR PRODUCING METHOD

TECHNICAL FIELD

The present invention relates to an oxygen-enriched air producing device and an oxygen-enriched air producing method, with which part of nitrogen contained in air is removed from the air so as to produce oxygen-enriched air, the oxygen concentration of which is increased compared to that of the air.

BACKGROUND ART

To realize a low carbon society and to secure energy, efficient use of fossil fuels such as coal and oil is effective. For example, when burning coal in an iron-making blast furnace and a coal-fired power generation, which are comparatively large emission sources of $CO_2$, oxygen (pure oxygen) or air (oxygen-enriched air), the oxygen concentration of which is increased compared to that of the atmosphere (air) as is, is blown instead of the atmosphere. This allows coal to be subjected to high-calorie burning and, as a result, thermal efficiency is increased.

Patent Literature 1 describes a cryogenic separation method as a method of producing pure, oxygen used for high-calorie burning of fossil fuel as described above. In this method, after air has been cooled and liquefied, oxygen is fractionated from the air by utilizing the difference in boiling point between oxygen and nitrogen.

Among practically used methods of producing oxygen or oxygen-enriched air, the above-described cryogenic separation method can produce oxygen or the like at a lowest cost. However, nowadays, there is a demand for further reducing the cost of oxygen or oxygen-enriched air.

However, with the above-described cryogenic separation method, since air is cooled to a cryogenic temperature and liquefied, a theoretical limit of Carnot refrigerator efficiency cannot be exceeded in principle. Specifically, the theoretical value of energy efficiency in the cryogenic separation method is low: equal to or less than 34%. With the cryogenic separation method, energy efficiency equal to or higher than the above-described value cannot be obtained.

Thus, it is very difficult to produce oxygen or oxygen-enriched air so as to further reduce the unit cost of production.

Patent Literature 2 describes a device that produces oxygen-enriched air from room-temperature air (about 300 K).

This device removes part of nitrogen from air so as to produce oxygen-enriched air by utilizing the fact that, among the components of air, only oxygen is paramagnetic and other components are non-magnetic.

Specifically, as illustrated in FIG. 14, this device includes a cylindrical container 102 and a pair of magnets 104. Air flows in the container 102, which is formed of a non-magnetic material. The pair of magnets 104 form a magnetic field in the container 102 in a direction perpendicular to the air flow direction. The air flowing in the container 102 is supplied from one end portion 102a of the container 102. Two separator plates 106 are disposed at another end portion 102b of the container 102. These two separator plates 106 have leading ends in the magnetic field formed by the pair of magnets 104 and are disposed in a position perpendicular to the magnetic field and parallel to each other. Thus, two separator plates 106 divide a region on the other end side in the container 102 into three sections in a direction perpendicular to the magnetic field. A first passage tube 110 is connected to an outlet 108b.

In the container 102, the outlet 108b is open at the end of a central channel 108 interposed between two separator plates 106. Second passage tubes 114 are connected to respective outlets 112b. In the container 102, the outlets 112b are open at the ends of respective side channels 112 positioned on both sides of the central channel 108 with the central channel 108 interposed therebetween.

In a device 100 having the above-described structure, air supplied from the one end portion 102a flows toward the other end portion 102b in the container 102. When the air enters the magnetic field formed by the pair of magnets 104, only oxygen in the air is magnetized. Thus, components of the air other than oxygen straightly advances toward the other end portion 102b in the container 102 without being affected by the magnetic field. In contrast, the magnetized oxygen advances in a path bent by the magnetic field formed by the pair of magnets 104. Referring to FIG. 14, the magnetized oxygen is bent rightward or leftward and enters the side channels 112. Thus, air containing an increased amount of oxygen (oxygen-enriched air) is exhausted to the second passage tubes 114. By collecting the exhausted air, a specified amount of oxygen-enriched air is obtained.

Production of oxygen-enriched air from room-temperature air (300 K) is simulated by using the above-described device 100 that utilizes the magnetic field. The difference in oxygen concentration between room-temperature air and the oxygen-enriched air produced from this room-temperature air is about 0.1%. Furthermore, in the above-described device 100, a very high magnetic field gradient of, for example, 100 T/m, needs to be formed in the air flow direction in the container 102. Thus, producing this device for actual and practical use is very difficult.

CITATION LIST

Patent Literature

PTL 1: Japanese Unexamined Patent Application Publication No. 10-218603

PTL 2: Japanese Unexamined Patent Application Publication No. 2004-49998

SUMMARY OF INVENTION

An object of the present invention is to provide an oxygen-enriched air producing device and an oxygen-enriched air producing method, with which oxygen-enriched air can be produced from air by utilizing a magnetic field at a low cost.

With an oxygen-enriched air producing device and an oxygen-enriched air producing method according to the present invention, a magnetic field is formed in a flow channel tube having a tube wall, which is formed of a non-magnetic material that allows part of air flowing in the flow channel tube to pass through the tube wall to be exhausted to an outside of the flow channel tube when pressure outside the flow channel tube is lower than that in the flow channel tube, the air, is supplied into the flow channel tube so that a region in which the air flows at least under laminar flow conditions is formed in the flow channel tube, and the pressure outside the flow channel tube is reduced to a specified pressure. Thus, according to the present invention, the oxygen-enriched air producing device and the oxygen-enriched air producing method, with which oxygen-enriched air can be produced from air by utilizing a magnetic field at a low cost, can be provided.

The above-described and other objects, features, and advantages of the present invention will become apparent from the following detailed description and the attached drawings.

DESCRIPTION OF EMBODIMENTS

Figure 1:
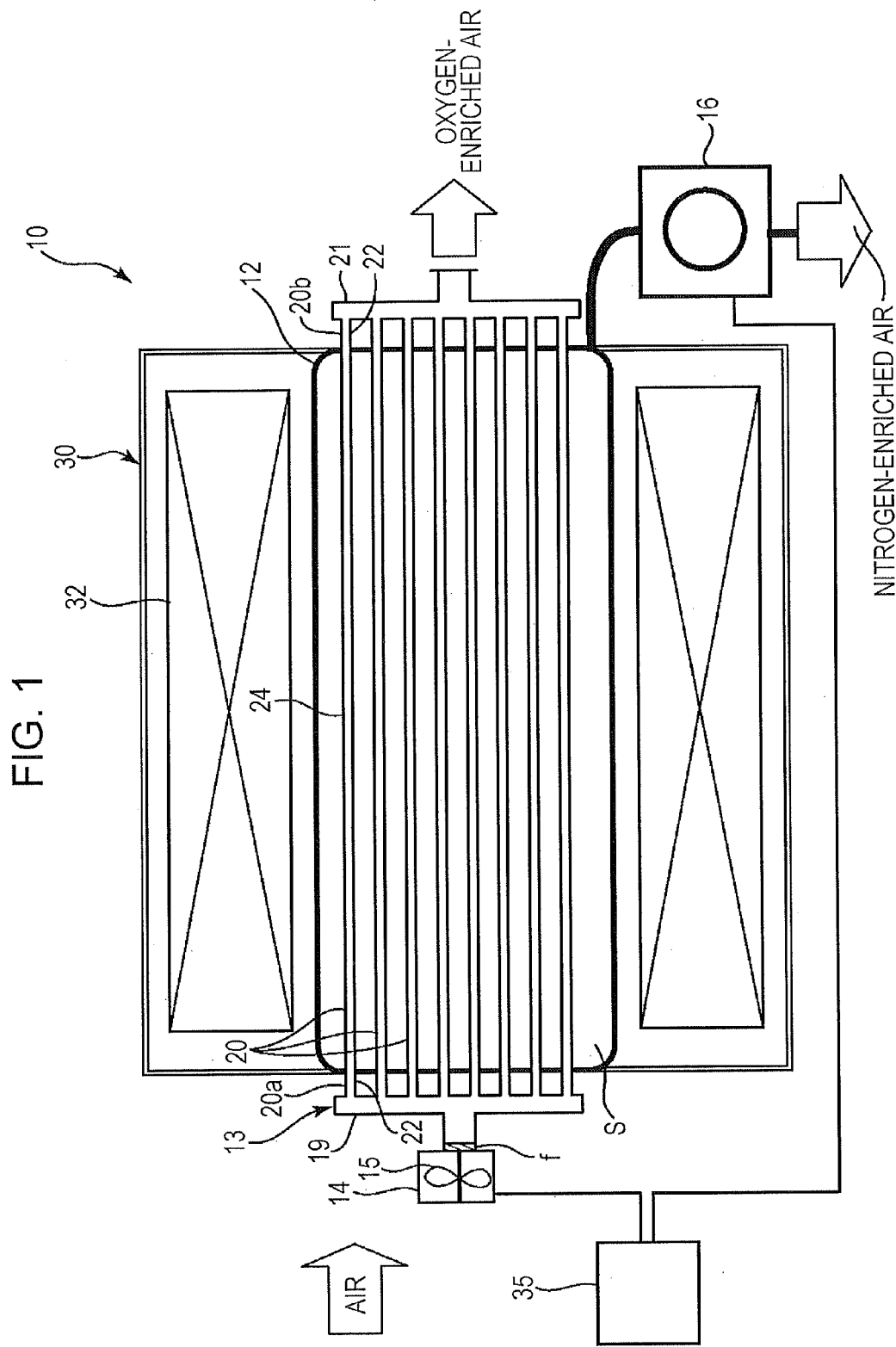
FIG. 1 is a general block diagram of an oxygen-enriched air producing device according to a first embodiment.

A first embodiment according to the present invention will be described below with reference to the drawings.

An oxygen-enriched air producing device (may be alternatively simply referred to as "producing device" hereafter) according to the present embodiment produces air, in which oxygen is highly concentrated (oxygen-enriched air). Oxygen-enriched air is used in order to, for example, improve thermal efficiency and reduce exhaust gases (such as $CO_2$ gas) when a fossil fuel such as coal or oil is burned in facilities such as iron-making blast furnace or in such operations such as generation of electrical power. In oxygen-enriched air, the oxygen concentration is higher than that of the atmosphere.

The producing device produces oxygen-enriched air, the oxygen concentration of which is higher than that of input air. The producing device includes hermetically sealed container unit, flow channel tubes, an air supply unit, a pressure reducing unit, and a magnetic field forming unit. The hermetically sealed container unit surrounds a specified pressure reduction region so as to hermetically seal the pressure reduction region. At least part of each of the flow channel tubes extend through the hermetically sealed container unit. The air supply unit supplies air into the flow channel tubes. The pressure reducing unit reduces pressure in the hermetically sealed container unit so that the pressure in the hermetically sealed container unit is lower than that in the flow channel tubes. The magnetic field forming unit forms magnetic fields in the flow channel tubes. The flow channel tubes have regions therein where air supplied by the air supply unit flows so as to at least satisfy laminar flow conditions. A tube wall of a permeation portion (pressure reduction region portion) of the flow channel tubes, the permeation portion being positioned in the hermetically sealed container unit, is formed of a material that is a non-magnetic material and that allows part of the air flowing in the permeation portion to pass through the tube wall to be exhausted to the outside of the permeation portion when pressure in the hermetically sealed container unit is lower than that in the pressure reduction region portion.

The producing device produces oxygen-enriched air by removing part of nitrogen contained in input air (may be alternatively simply referred to as "air" hereafter) from room-temperature air as describe below.

Air contains oxygen. Since oxygen is a paramagnetic material, oxygen is magnetized under a magnetic field of a specified field strength. When a fluid in which magnetic particles are dispersed is magnetized, due to interaction between the magnetic particles and an external magnetic field and interaction between the magnetic particles (for example, cohesive force), the viscosity of the fluid is increased as the function of the magnetic field. Accordingly, when air flows through a magnetic field, the viscosity of oxygen (more exactly, an oxygen gas) contained in the air is significantly increased in a region where the flow velocity gradient is large. That is, when air flows through a magnetic field, components of air other than oxygen are not magnetized because they are non-magnetic substances. Thus, the viscosity of the components other than oxygen is maintained. Only oxygen contained in air that flows through the magnetic field is magnetized and the velocity of the oxygen flowing near the tube walls of the flow channel tubes is increased.

Since air is mainly composed of oxygen and nitrogen (21% and about 79%, respectively, in volume ratio). Thus, air can be regarded as a two-component fluid mixture of oxygen and nitrogen. Here, when a two-component fluid mixture, the components of which have respective single-phase viscosities different from each other, is caused to flow in the flow channel tube so as to satisfy the laminar flow conditions at least in a region adjacent to the inner circumferential surface of the flow channel tube, the component having a higher viscosity moves toward the center (tube axis) and the component having a lower viscosity remains near the inner circumferential surface of the tube wall. In this state, as long as air flows in the flow channel tube so as to satisfy the laminar flow conditions at least in a region adjacent to the inner circumferential surface of the flow channel tube, it is allowed that turbulence is generated in the central portion of the flow channel tube.

Accordingly, the component of air having a higher viscosity is concentrated in a region near the center in the flow channel tube. In contrast, the component of air having a lower viscosity is concentrated in a region near the inner circumferential surface of the flow channel tube. A so-called viscosity separation (viscosity segregation) occurs. Thus, when a magnetic field is formed in the flow channel tube and air is caused to flow in the flow channel tube so as to satisfy the laminar flow conditions at least in a region adjacent to the inner circumferential surface of the flow channel tube, oxygen, the viscosity of which is increased, is concentrated in a region near the center (tube axis) of the flow channel tube, and nitrogen is concentrated in a region near the inner circumferential surface of the flow channel tube. Also, even in the case where the two-component fluid mixture is caused to flow so as to satisfy the laminar flow conditions in an entire region of the flow channel tube, when a magnetic field is formed in the flow channel tube, oxygen is concentrated in a region near center of the flow channel tube, and nitrogen is concentrated in a region near the inner circumferential surface (tube wall side) of the flow channel tube.

The tube wall of the flow channel tube, in which the magnetic field is formed, is formed of a non-magnetic material that allows part of air flowing in the flow channel tube to pass through the tube wall to be exhausted to the outside of the flow channel tube when pressure outside (surrounding) the flow channel tube is lower than that in the flow channel tube. Thus, when pressure outside the flow channel tube is set to lower than that in the flow channel tube, nitrogen (more exactly, nitrogen-enriched air) concentrated in a region near the inner circumferential surface of the flow channel tube is exhausted to the outside of the flow channel tube through the tube wall. Thus, the ratio of nitrogen contained in air flowing in the flow channel tube, in which the magnetic field is formed, decreases. As the nitrogen decreases, the ratio of oxygen contained in the air increases. As a result, oxygen-enriched air is obtained.

Figure 2:
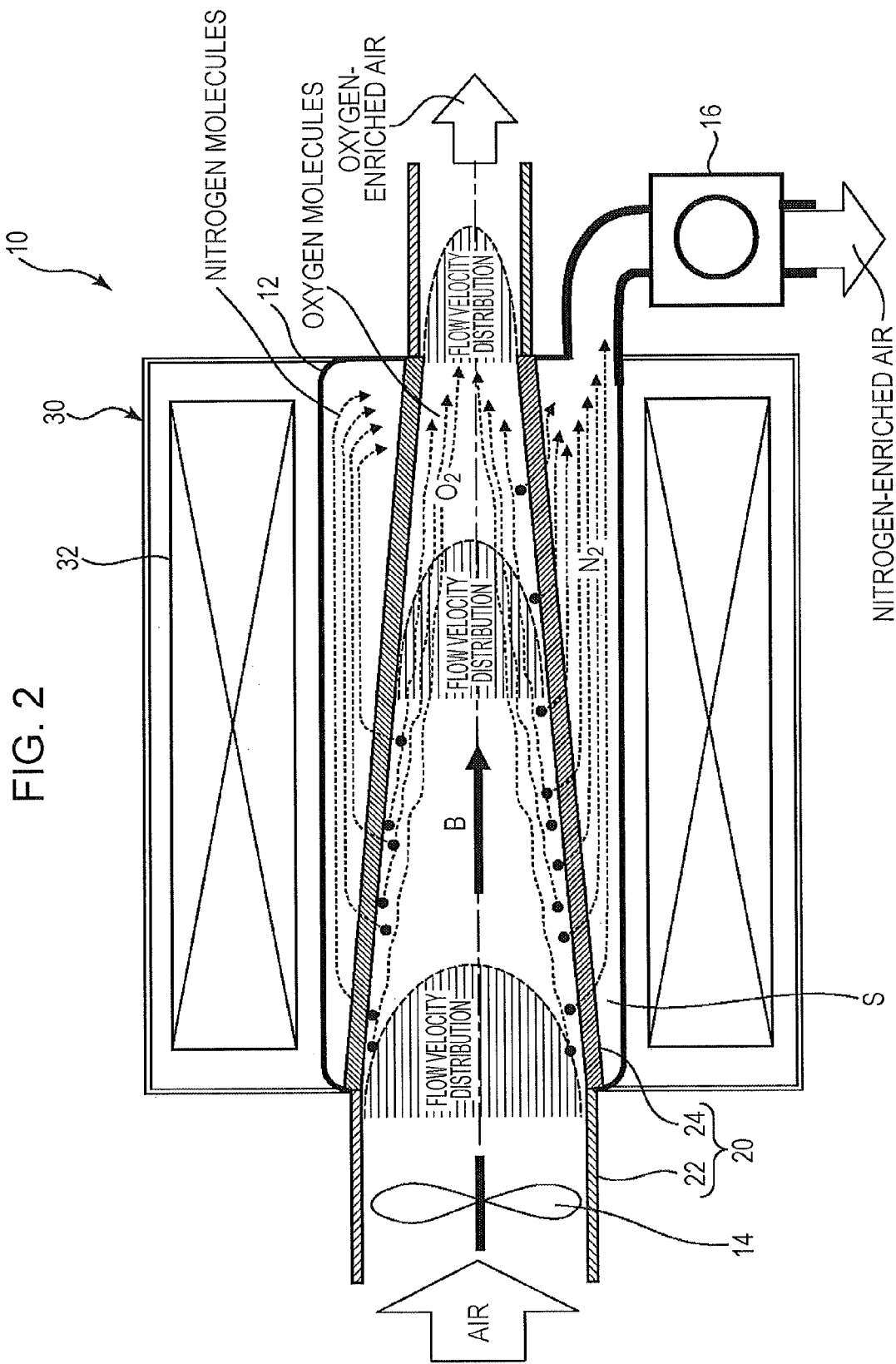
FIG. 2 is a schematic diagram for explaining the principle of production of oxygen-enriched air in the oxygen-enriched air producing device.

More specifically, as illustrated in FIGS. 1 and 2, the producing device includes a hermetically sealed container unit 12, a flow channel unit 13, an air supply unit 14, a pressure reducing unit 16, a magnetic field forming unit 30, and a control unit 35.

The hermetically sealed container unit 12 surrounds a specified region (pressure reduction region/pressure reduction space) S so as to hermetically seal the specified region S. Specifically, the hermetically sealed container unit 12 is formed of a non-magnetic material and surrounds a region in which the magnetic field is formed (in the present embodiment, inside the bore of a superconductive coil 32) by the magnetic field forming unit 30 so as to hermetically seal the region. Although the hermetically sealed container unit 12 is preferably formed of, for example, SUS316L stainless steel or an aluminum alloy, the material of the hermetically sealed container unit 12 is not limited to this.

The flow channel unit 13 includes an air distribution unit 19, a plurality of flow channel tubes 20, and an air gathering unit 21.

The air distribution unit 19 distributes air (input air) supplied from the air supply unit 14 to each of the flow channel tubes 20. The air distribution unit 19 according to the present embodiment distributes air supplied from the air supply unit 14 to the flow channel tubes 20 so that the flow rate of air in the flow channel tubes 20 are substantially equal to one another.

Each of the flow channel tubes 20 uses a cylindrical hollow member formed of a non-magnetic material. In each of the flow channel tubes 20, at least part of each of the flow channel tubes 20 extends through the hermetically sealed container unit 12 (pressure reduction region S). Air flows in the flow channel tubes 20 so as to satisfy the laminar flow conditions. Specifically, each of the flow channel tubes 20 has a cylindrical shape and the section of the flow channel tube 20 perpendicular to the tube axis at a position in the tube axis direction has a circular shape. Each of the flow channel tubes 20 has a non-permeation portion 22 and a permeation portion (pressure reduction region portion) 24. Although air flows under the laminar flow conditions in a substantially entire region of the flow channel tube 20 in the present embodiment, the flow of air is not limited to this. That is, it is sufficient that air flow in the flow channel tube 20 so as to satisfy the laminar flow conditions at least in a region adjacent to the inner circumferential surface of the flow channel tube 20, and it is allowed that turbulence is generated in the central portion (near tube axis) of the flow channel tube 20.

The non-permeation portion 22 is a portion of the flow channel tube 20 positioned in outside the hermetically sealed container unit 12. The tube wall of the non-permeation portion 22 is formed of a material that does not allow air flowing in the non-permeation portion 22 to leak to the outside of the flow channel tube 20.

The permeation portion 24 is a portion of the flow channel tube 20 positioned in the hermetically sealed container unit 12 (in the pressure reduction region S). The tube wall of the permeation portion 24 is formed of such a material that allows part of air flowing in the permeation portion 24 to pass through the tube wall when the pressure outside the permeation portion 24 (pressure reduction region S) is lower than the pressure inside the permeation portion 24. Specifically, the tube wall of the permeation portion 24 is formed of a porous material. Thus, when the hermetically sealed container unit 12 is evacuated and the pressure in the pressure reduction region S is reduced to a pressure lower than that in the permeation portion 24, air near the inner circumferential surface of the tube wall of the permeation portion 24 is exhausted to the outside through fine holes of the tube wall. Although the tube wall of the permeation portion 24 according to the present embodiment is formed of an unglazed ceramic, the material of the permeation portion 24 is not limited to this. For example, the tube wall of the permeation portion 24 may be formed of a sintered non-magnetic metal or a porous polymeric resin, or the like. Alternatively, the tube wall of the permeation portion 24 may be formed of, for example, a material such as silicon having permeability to nitrogen higher than its permeability to oxygen.

The permeation portion 24 of each flow channel tube 20 has a flow channel space in which air in the permeation portion 24 flows. The sectional area of the section of the flow channel space perpendicular to the tube axis is continuously reduced toward the downstream side.

FIG. 2 is a schematic diagram illustrating the principle of a producing device 10. For this purpose, only one of the flow channel tubes 20 is illustrated in FIG. 2.

The ratio between the opening area of an inlet portion 20a and the opening area of an outlet portion 20b in the flow channel tube 20 is set in accordance with the oxygen concentration in oxygen-enriched air to be exhausted from the outlet portion 20b. The reason for this is as follows: when the pressure in the hermetically sealed container unit 12 is sufficiently reduced to a pressure lower than that in the flow channel tube 20 (permeation portion 24), as the air advances in the permeation portion 24 of the flow channel tube 20 toward the downstream side, nitrogen in the air is gradually removed (exhausted to the outside of the flow channel tube 20), thereby gradually reducing the flow rate of the air flowing in the flow channel tube 20 as the air advances toward the downstream in the flow channel tube 20 (see FIG. 2). The inlet portion 20a is an end portion of the flow channel tube 20 on the side from which the air is supplied. The outlet portion 20b is an end portion of the flow channel tube 20 on a side opposite to the inlet portion 20a.

Specifically, in order to obtain oxygen-enriched air, the oxygen concentration of which is X%, the ratio between the opening area of the inlet portion 20a and the opening area of the outlet portion 20b is set to 21/X. This area ratio is represented as the ratio between the inner diameters of the inlet portion 20a and the outlet portion 20b as follows:

$$\sqrt{\frac{21}{X}} \quad (1)$$

In this expression (1), "21" represents the volume ratio (21%) of oxygen in air.

The flow channel tube 20 (permeation portion 24) does not necessarily have a shape, the inner diameter of which is continuously or gradually reduced toward the downstream side in the flow channel tube 20. That is, the flow channel tube 20 (permeation portion 24) may have a shape, the inner diameter of which is uniform at positions in the tube axis direction. In other words, in the flow channel tube 20 (permeation portion 24), the sectional area of the section of the flow channel space, through which the air in the flow channel tube 20 flows, perpendicular to the tube axis may be uniform at positions in the tube axis direction.

The air gathering unit 21 causes the air (oxygen-enriched air) exhausted from each of the flow channel tubes 20 to be gathered (collected) together and exhausts the gathered air.

In the flow channel unit 13, each flow channel tube 20 may be formed only of the permeation portion 24 (that is, the non-permeation portion 22 is not necessarily provided). In this case, the permeation portion 24 is directly connected to the air distribution unit 19 and the air gathering unit 21.

The air supply unit 14 supplies air into the flow channel tube 20. The air supply unit 14 is connected to the control unit 35 so as to adjust the flow rate, flow velocity, and the like of the air to be supplied into the flow channel tube 20 in accordance with command signals from the control unit 35. The air supply unit 14 sends air therearound (or around the inlet portion 20a of the flow channel tube 20) into the flow channel tube 20 without, for example, compressing or heating the air. The air supply unit 14 according to the present embodiment uses a blower that sends air by rotating a fan 15. The air supply unit 14 includes a filter f disposed between the fan 15 and the air distribution unit 19. The filter f removes dust and the like from the air to be supplied to the air distribution unit 19 (into each flow channel tube 20).

The pressure reducing unit 16 reduces the pressure in the hermetically sealed container unit 12 so that the pressure in the hermetically sealed container unit 12 (pressure reduction region S) is lower than that in the flow channel tube 20 (more exactly, permeation portion 24). Specifically, the pressure reducing unit 16 reduces the pressure in the hermetically sealed container unit 12 through exhaustion of air in the hermetically sealed container unit 12. Furthermore, the pressure reducing unit 16 is connected to the control unit 35 so as to adjust the amount of exhaustion in accordance with command signals from the control unit 35. Although the pressure reducing unit 16 according to the present embodiment uses a vacuum pump, the pressure reducing unit 16 is not limited to this. The pressure reducing unit may use a device other than the vacuum pump as long as the pressure reducing unit can reduce the pressure in the hermetically sealed container unit 12 to a specified pressure and maintain the specified pressure.

The magnetic field forming unit 30 forms a magnetic field in each flow channel tube 20. The magnetic field forming unit 30 according to the present embodiment uses a superconductive electromagnet that includes the superconductive coil 32. The magnetic field forming unit 30 forms a magnetic field in each flow channel tube 20 (permeation portion 24 in the present embodiment) positioned in the hermetically sealed container unit 12, which is disposed in the bore of the superconductive coil 32. Specifically, the magnetic field forming unit 30 forms a uniform (or substantially uniform) magnetic field of equal to or more than 3 T in the bore (exactly, inside the portion of the flow channel tube 20 disposed in the bore). The magnetic field forming unit 30 forms the magnetic field in the tube axis direction of a straight tube portion (permeation portion 24) in the straight tube portion of each flow channel tube 20.

The direction of the magnetic field formed in the flow channel tube 20 is not limited. The magnetic field forming unit 30 according to the present embodiment forms a magnetic field in the tube axis direction of the straight tube portion in the straight tube portion (permeation portion 24). However, the magnetic field forming unit may form a magnetic field in a direction, for example, perpendicular to the flow channel tube 20 or inclined to (intersecting) the flow channel tube 20 (see FIG. 10). The magnetic field formed by the magnetic field forming unit 30 is not necessarily uniform. The magnetic field forming unit 30 is not limited to the superconductive magnet including the superconductive coil 32. The magnetic field forming unit 30 may instead be, for example, a pair of magnets that oppose each other and form therebetween a magnetic field in which magnetic lines of force are directed from one of the magnets to the other.

The control unit 35 controls the air supply unit 14 and the pressure reducing unit 16. Specifically, the control unit 35 controls the pressure reducing unit 16 so that, in the permeation portion 24, air in a region adjacent to the inner circumferential surface of the permeation portion 24 (near inner circumferential surface) is exhausted to the outside through the tube wall, thereby adjusting the pressure in the hermetically sealed container unit 12 (pressure reduction region S). Also, the control unit 35 controls the air supply unit 14 so that the air flowing in the flow channel tube 20 satisfies the laminar flow conditions over an entire region of the flow channel tube 20 in the tube axis direction and so that the flow velocity gradient of the air near the inner circumferential surface of the flow channel tube 20 is uniform, thereby adjusting the flow rate and the like of the air supplied into the flow channel tube 20.

It is sufficient that the control unit 35 at least control the air supply unit 14 so that the air flows so as to satisfy the laminar flow conditions near the inner circumferential surface (region adjacent to the inner circumferential surface) of the flow channel tube 20 and so that the flow velocity gradient of the air near the inner circumferential surface of the flow channel tube 20 is uniform, thereby adjusting the flow rate and the like of the air supplied into the flow channel tube 20.

Figure 3:
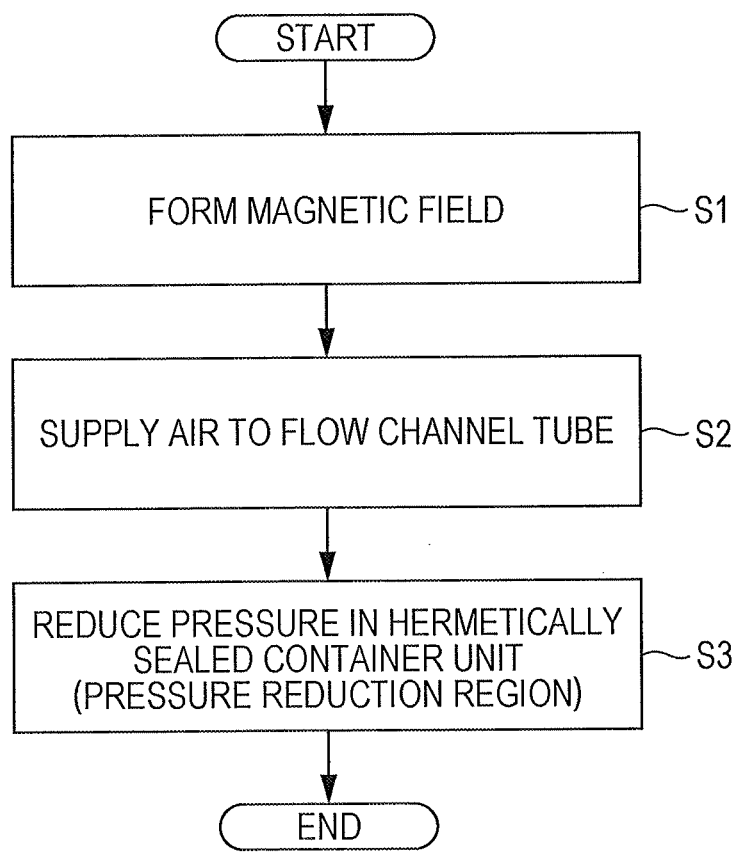
FIG. 3 is a flow chart showing production steps of oxygen-enriched air in the oxygen-enriched air producing device.

With such a producing device 10, oxygen-enriched air is produced as illustrated in FIG. 3 and in the following description.

The magnetic field forming unit 30 (superconductive magnet according to the present embodiment) initially forms the magnetic field in the hermetically sealed container unit 12 (pressure reduction region S) (step S1). In this state, the control unit 35 causes the air supply unit 14 to supply air into each flow channel tube 20 from the inlet portion 20a of the flow channel tube 20 by using the air distribution unit 19 (step S2). At this time, the air supply unit 14 supplies the air into the flow channel tube 20 so that the air flows in the flow channel tube 20 forms a laminar flow. Thus, the air supplied from the air supply unit 14 flows in the flow channel tube 20 from the inlet portion 20a toward the outlet portion 20b while satisfying the laminar flow conditions. That is, the flow of the air in the flow channel tube 20 is a laminar flow over an entire region of the flow channel tube 20 in the tube axis direction. The air is mainly composed of nitrogen as a non-magnetic material and oxygen as a paramagnetic material. Specifically, nitrogen is 79% and oxygen is 21% in volume ratio. Thus, air can be regarded as a two-component fluid of nitrogen and oxygen.

Figure 4:
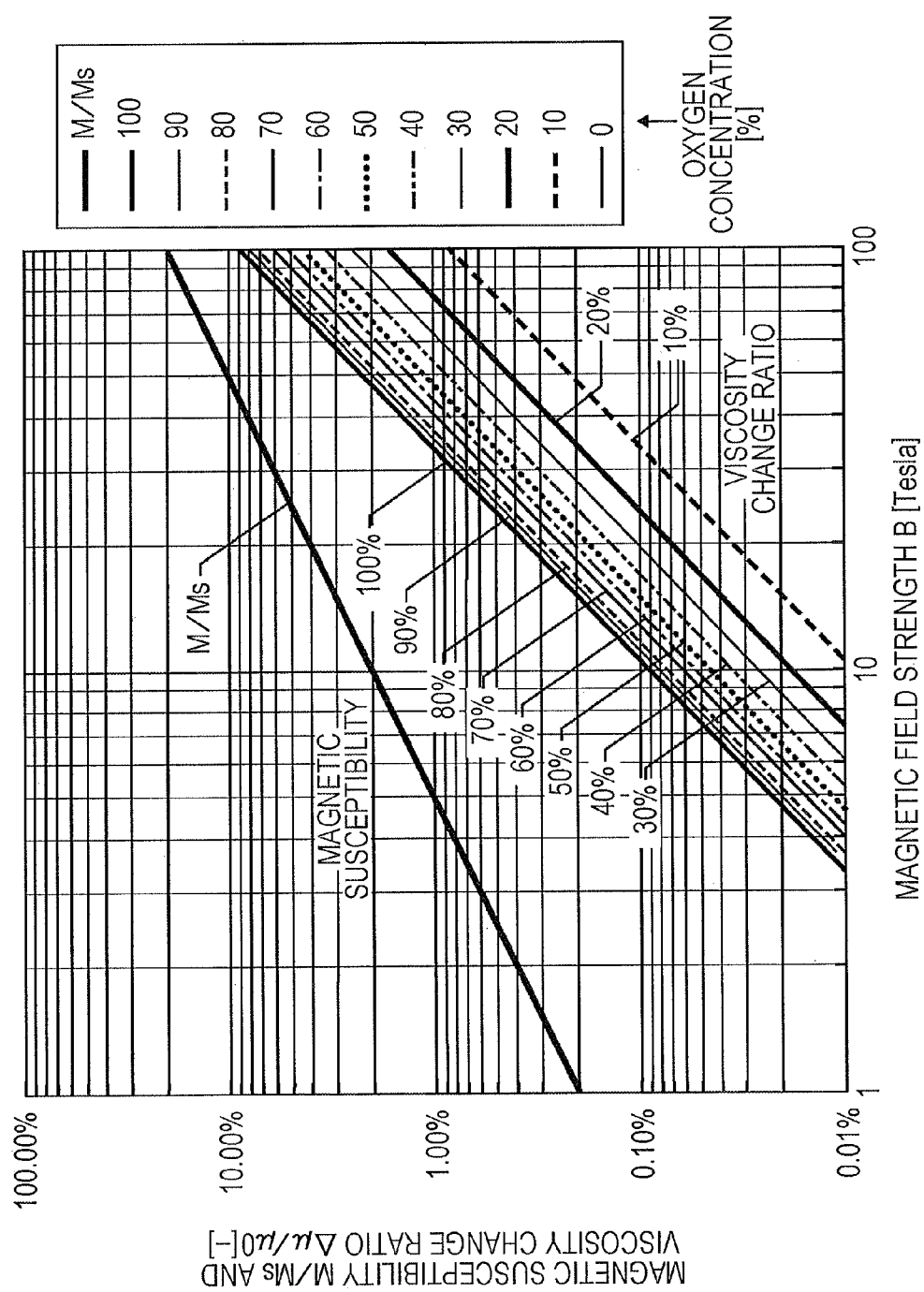
FIG. 4 illustrates the magnetic susceptibility and the viscosity change ratio of oxygen in a strong magnetic field.

When the air enters the magnetic field formed by the magnetic field forming unit 30, oxygen as a paramagnetic material is magnetized. In the present embodiment, the temperature of air is, for example, 300 K, and the strength of the magnetic field is, for example, 10 T. Thus, as illustrated in FIG. 4, the magnetic susceptibility of oxygen contained in the air is about 2%. The magnetization curve illustrated in FIG. 4 increases in proportion to the magnetic field, reaches 50% at equal to or more than hundreds of teslas, and then becomes a saturation curve.

When a fluid in which magnetic particles are dispersed is magnetized, due to interaction between the magnetic particles and an external magnetic field and interaction between the magnetic particles (such as cohesive force), the viscosity of the fluid is increased as a function of the magnetic field. Thus, in air flowing in the flow channel tube 20, when oxygen contained in the air is magnetized, the viscosity of the oxygen (more exactly, oxygen gas contained in the air) is increased.

Specifically, the viscosity of oxygen is expressed by the following expression (2).

$$\eta(H) = \eta_0\left(1 + \frac{5}{2}\phi + \frac{3}{2}\phi\frac{\xi - \tanh\xi}{\xi + \tanh\xi}\sin^2\alpha + \phi^2 \cdot f(\xi)\right) \quad (2)$$

Here, $\xi$ is a normalized parameter in the Langevin function and determined by the ratio between the strength of the magnetic field and the absolute temperature, $\eta$ is the viscosity (Pa·s), and $\phi$ is the volume fraction of the dispersed particles (oxygen molecules).

Figure 5:
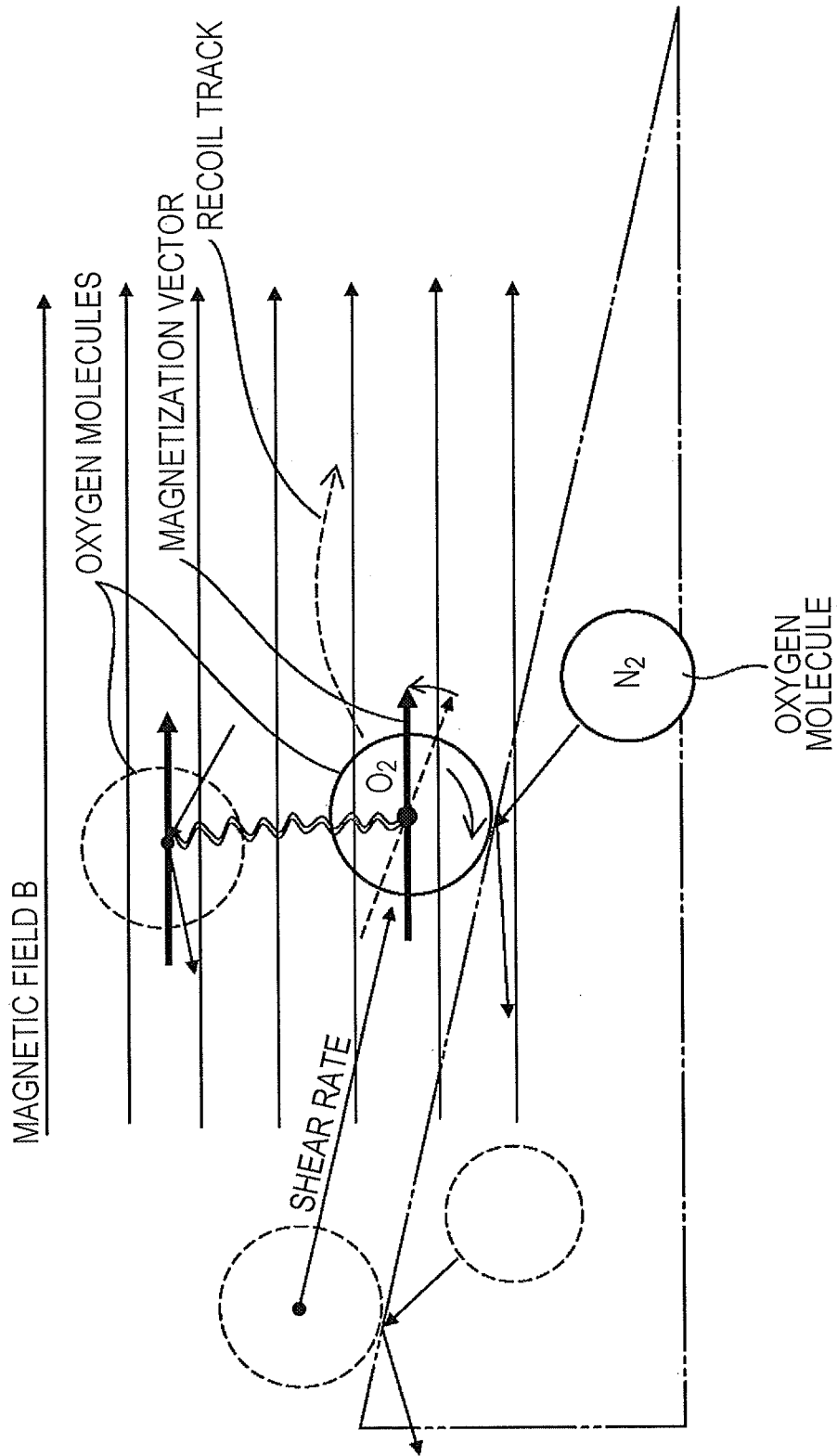
FIG. 5 illustrates an oxygen molecule model in part of a flow having a flow velocity gradient.

In this expression (2), the effect of the magnetic field is expressed in the third term. Briefly described, this third term expresses the effect of rolling friction torque attributable to shear rate. Here, with reference to FIG. 5, intuitive meaning of the third term is described.

An oxygen molecule in part of a flow having a flow velocity gradient (shear rate) can be modeled as a hard sphere that rolls while being subjected to sliding friction and rolling friction. Although the slope illustrated in FIG. 5 does not actually exist, it is assumed that, in a coordinate system moving at an average flow velocity, impulse reaction of a nitrogen molecule or an oxygen molecule colliding from the opposite side of the slope equals to a rigid slope. In this model, when an oxygen molecule having rolled from a non-magnetic field region enters a region where an external magnetic field (magnetic field formed by the magnetic field forming unit 30 in the present embodiment) is present, the oxygen molecule becomes unlikely to roll by a sudden increase in rolling friction caused by magnetizing moment of the oxygen being subjected to interaction (torque) of the external magnetic field. As a result, resistance due to sliding friction becomes significant. This effect is recognized as an increase in the velocity. As represented in the third term of the expression (2), this magnetic field effect can be calculated as a function of the normalized parameter $\xi$ similar to the magnetic susceptibility and represented as the viscosity change ratio as illustrated in FIG. 4.

The fourth term of the expression (2) represents a cohesion effect caused by interaction between molecules in a strong magnetic field region. Specifically, the viscosity is a macro phenomenon of a transport characteristics caused by a collision where gas molecules collide with each other. However, in a collision where oxygen molecules collide with each other, the directions of the magnetizing moments of both the oxygen molecules involved in the collision are frequently uniformly aligned in the strong magnetic field. Thus, pulling (adhesion force) interaction (see wavy line in FIG. 5) is added to the macro phenomenon of the transport characteristics. This effect (interaction) further increases the viscosity.

As described above, in air flowing in the flow channel tube 20 in which the magnetic field is formed, only the viscosity of oxygen as a paramagnetic material is increased and the viscosity of nitrogen as a non-magnetic material does not change. For this reason, air can be regarded as a two-component (oxygen and nitrogen) fluid mixture, the components of which have respective single-phase viscosities different from each other.

Here, when a two-component fluid mixture, the components of which have respective single-phase viscosities different from each other, flows in a cylindrical tube so as to satisfy the laminar flow conditions, the component having a higher viscosity is concentrated in a region near the center (tube axis) and the component having a lower viscosity is concentrated in a region near the inner circumferential surface of the tube wall. This phenomenon is referred to as viscosity separation (viscosity segregation).

Thus, when air flows in the flow channel tube 20, in which the magnetic field is formed, the oxygen having an increased viscosity is gathered in a region near the center (tube axis) of the flow channel tube 20 (that is, the oxygen is concentrated in a region near the center). In contrast, as the oxygen moves toward the center of the flow channel tube 20, the nitrogen remains in a region near the inner circumferential surface of the flow channel tube 20 (that is, the nitrogen is concentrated in a region near the inner circumferential surface). The details are described below.

Air is regarded as a fluid mixture of oxygen and nitrogen and this air flows in the cylindrical flow channel tube 20 so as to satisfy the laminar flow conditions. Here, the laminar flow conditions are defined as follows:

Reynolds number:

$$R_\theta = \frac{U \cdot L}{(\mu/\rho)} M \rightarrow \frac{U_O \cdot D}{(\mu/\rho)} \ll 2000 \quad (3)$$

where U is a characteristic velocity in m/s, ~$U_o$ is a central velocity in m/s, L is a characteristic length in m, ~D is a diameter of flow channel tube in m, and $\mu$ is a viscosity or viscosity coefficient in Pa·s.

Figure 6:
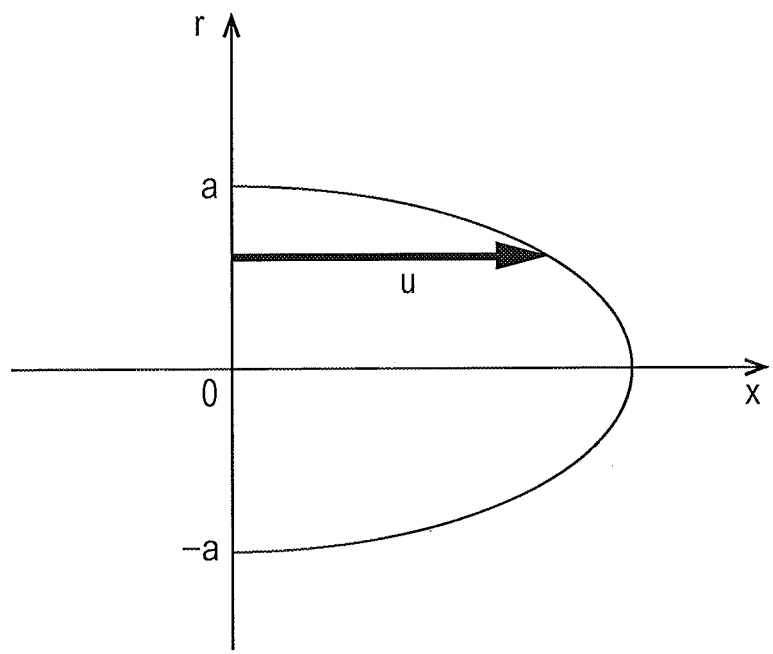
FIG. 6 illustrates a flow velocity distribution of air in a flow channel tube.

The flow of the air is a Hagen-Poiseuille flow. At this time, the flow velocity is distributed in a parabolic shape about the center (tube axis) of the flow channel tube 20 (see FIGS. 2 and 6) and expressed by the following expression (4).

$$u(r) = \frac{U_0}{(D/2)^2} \cdot [(D/2)^2 - r^2] \quad (4)$$

where $U_o=2<U>=8Q/\pi D^2$, Q is the total flow rate, and $<U>$ is an average flow velocity.

The following expression (5) can be obtained from the expression (4).

$$\frac{d}{dr}u(r) = -\frac{2U_0}{D}\left(\frac{2r}{D}\right) \quad (5)$$

As described above, the flow velocity gradient of the air flowing in the flow channel tube 20 is zero at the center (tube axis; r=0) of the flow channel tube 20 and at the maximum ($2U_o/D$) at the inner circumferential surface (r=D/2) of the tube wall. The above-described viscosity separation phenomenon is generated by a high flow velocity gradient (that is, high shear velocity) in a region adjacent to the inner circumferential surface of the tube wall (near the inner circumferential surface).

More exactly, for example, since the magnetic susceptibility of the oxygen in the present embodiment is 2%, when one of the oxygen molecules is focused, the one oxygen molecule is magnetized for average 2% of a period of time in which the one oxygen molecule flows in the permeation portion 24. When the oxygen molecule is magnetized, rotation thereof is braked by the external magnetic field (magnetic field formed by the magnetic field forming unit 30). Here, assuming that an oxygen molecule drifts in a region where the flow velocity gradient is high (near the inner circumferential surface of the tube wall), it can be regarded that this oxygen molecule flows while being interposed between a high-speed flow line and a low-speed and rolling. When the rolling is suddenly suppressed by the external magnetic field, the oxygen molecule recoils and ejected to a place where the flow velocity gradient is lower (see the recoil track in FIG. 5). This is the viscosity separation phenomenon in the magnetic field specific to magnetic fluids and paramagnetic fluids.

Figure 7:
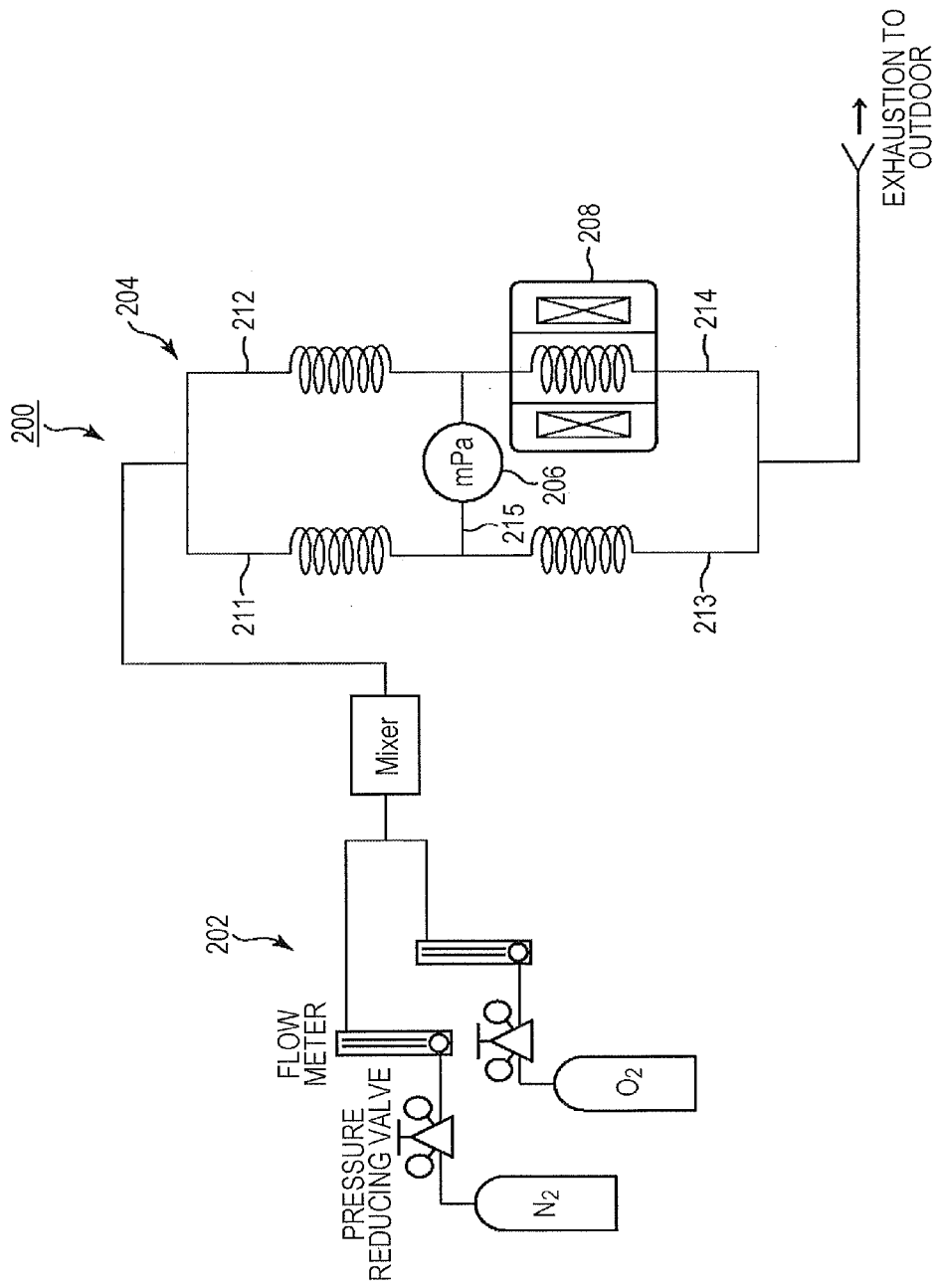
FIG. 7 is a general block diagram of an experiment apparatus for confirming whether or not a viscosity separation phenomenon is generated.

The above-described viscosity separation phenomenon is generated in a magnetic field of 3 T or more. This can be confirmed with an experiment apparatus 200 illustrated in FIG. 7.

The experiment apparatus 200 includes a gas supply unit 202 and a piping unit 204 (may be alternatively simply referred to as a "circuit-like piping unit" hereafter). Piping is arranged in a Wheatstone bridge circuit-like shape in the piping unit 204.

The gas supply unit 202 supplies a mixed gas composed of a nitrogen gas and an oxygen gas to the circuit-like piping unit 204. With the gas supply unit 202, the composition of the mixed gas (that is, the concentration of the oxygen gas relative to the nitrogen gas) to be supplied to the circuit-like piping unit 204 can be desirably changed, and the flow rate of the mixed gas to be supplied to the circuit-like piping unit 204 is changed.

First to fifth piping parts 211 to 215 is disposed in the circuit-like piping unit 204 so as to form a Wheatstone bridge circuit-like shape. A micrmanometer 206 is provided at a position (fifth piping part 215) corresponding to a position where an ammeter is disposed in a Wheatstone bridge circuit. The circuit-like piping unit 204 also includes a magnetic field producing unit 208 that uses, for example, a cryogen-free superconducting magnet or the like disposed in one piping part (fourth piping part) 214 out of two piping parts (third and fourth piping parts 213 and 214) downstream of the micrmanometer 206. The magnetic field producing unit 208 forms a magnetic field in the fourth piping part. The mixed gas having passed through the circuit-like piping unit 204 is exhausted to the atmosphere.

Figure 8:
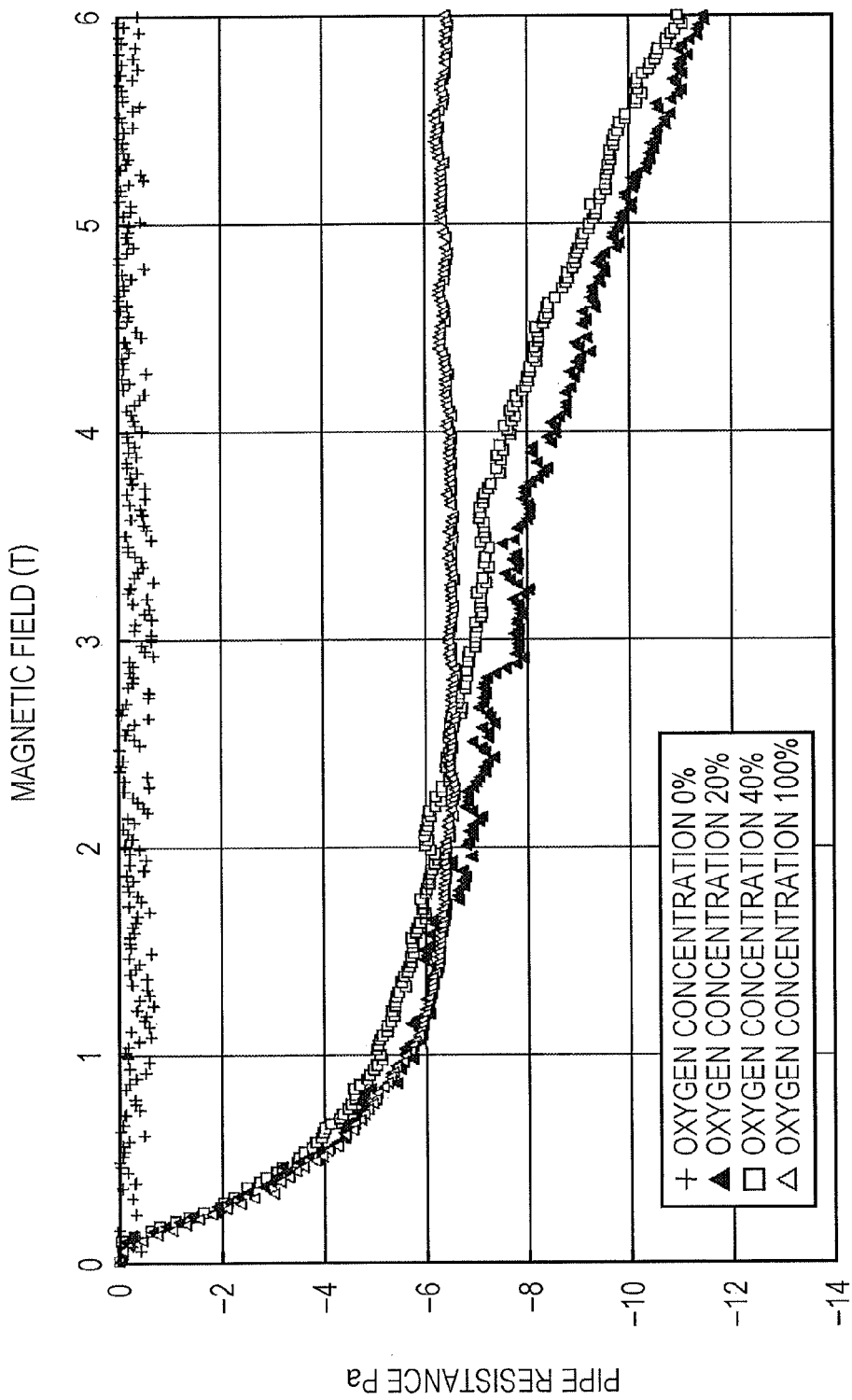
FIG. 8 illustrates the relationship between a pipe resistance and a magnetic field strength.

In the experiment apparatus 200, the gas supply unit 202 supplies a mixed gas of a specified composition to the circuit-like piping unit 204 while the magnetic field producing unit 208 produces a magnetic field of 0 to 6 T in the fourth piping part 214. The differential pressure in this state between the ends of the fifth piping part 215 is measured by the micrmanometer 206. The measurement results are plotted in FIG. 8.

It can be understood from the measurement results that, in the case where the oxygen concentration of the mixed gas to be supplied to the circuit-like piping unit 204 is 0% (that is, the nitrogen concentration is 100%), a pipe resistance value is not changed even when the magnetic field is applied. It can also be understood from the above-described measurement results that, in the case where the oxygen concentration of the mixed gas is 100%, the pipe resistance value is changed in a range from 0 to 2 T by the magnetic field effect for the oxygen, becomes constant near 2 T, and remains unchanged even when the magnetic field is further increased.

It can also be understood from the above-described measurement results that, in the case where the oxygen concentration of the mixed gas is 20% and 40%, these changes in pipe resistance value is caused by the magnetic field effect for the oxygen because the pipe resistance value is changed similarly to the case where the oxygen concentration is 100% up to a point near 2 T. In contrast, it can be understood that since changes in pipe resistance value in a range from 2 T and more of the above-described measurement results are different from that in the case of an oxygen concentration of 100%, changes in pipe resistance value in the range from 2 T and more are caused by the occurrence of a drift in the mixed gas in the magnetic field. These changes in pipe resistance value different from the case of the oxygen concentration of 100% are significant in a range from 3T and more. Thus, it can be confirmed that the viscosity separation phenomenon is generated in a range from 3 T and more.

The control unit 35, in addition to supplying the air to each flow channel tube 20 as mentioned before, causes the air in the hermetically sealed container unit 12 to be exhausted (reduce the pressure) with the pressure reducing unit 16 until the pressure in the pressure reduction region S is reduced to a pressure lower than that in each flow channel tube 20 (step S3). By doing this, the air near the inner circumferential surface (region adjacent to the inner circumferential surface) of the permeation portion 24 is exhausted to the outside of the permeation portion 24 (flow channel tube 20) through the tube wall of the permeation portion 24 (see FIG. 2). At this time, since the nitrogen-enriched air produced by the above-described viscosity separation phenomenon exists near the inner circumferential surface of the permeation portion 24, this air is exhausted, and accordingly, the ratio of the oxygen contained in the air flowing in the flow channel tube 20 is increased. That is, the oxygen concentration is increased. As the air advances toward the downstream side in the flow channel tube 20, the nitrogen is gradually exhausted through the tube wall of the permeation portion 24, thereby gradually increasing the oxygen concentration in the air flowing in the flow channel tube 20. Thus, the air containing the oxygen, the oxygen concentration of which has been increased (oxygen-enriched air), is exhausted from the outlet portion 20b of each flow channel tube 20 to the air gathering unit 21. The air gathering unit 21 gathers together the air (oxygen-enriched air) having been exhausted from each flow channel tube 20, and then sends the air to an iron-making blast furnace or for a power generating operation at the subsequent stage.

The air, which has been exhausted from the air flowing in the flow channel tube 20 into the hermetically sealed container unit 12 (pressure reduction region S) and contains much nitrogen (nitrogen-enriched air), is exhausted from the pressure reducing unit 16.

The step S2 and step S3 described above may be simultaneously performed or either of the step S2 and step S3 may be performed before the other step is performed.

In the above-described producing device 10, in the flow of air in the flow channel tube 20, oxygen as a paramagnetic material is moved toward the center of the flow channel tube 20 by the magnetic field. Thus, the ratio of nitrogen in the air near the inner circumferential surface of the flow channel tube 20 increases (that is, the nitrogen is concentrated in the air near the inner circumferential surface of the flow channel tube 20). In the producing device 10, the pressure outside (around) the flow channel tube 20 is reduced to a pressure lower than that in the flow channel tube 20, thereby exhausting the air near the inner circumferential surface of the flow channel tube 20, the air containing the concentrated nitrogen, to the outside of the flow channel tube 20 through the tube wall. This increases the oxygen concentration in the air remaining in the flow channel tube 20. Thus, the producing device 10 obtains oxygen-enriched air. Furthermore, with the above-described producing device 10, an energy efficiency higher than a theoretical limit of Carnot refrigerator efficiency can be achieved. That is, in the producing device 10, since oxygen-enriched air is produced from room-temperature air, energy efficiency is not restricted by the theoretical limit of Carnot refrigerator efficiency. For this reason, with the above-described producing device 10, oxygen-enriched air can be produced at a lower cost than that of oxygen-enriched air produced by, for example, the cryogenic separation method.

Also in the above-described producing device 10, since the nitrogen contained in the air (more exactly, nitrogen-enriched air) flowing in the permeation portion 24 is exhausted to the outside through the tube wall, the flow rate of the air flowing in the flow channel tube 20 decreases as the air advances toward the downstream side. Thus, in the producing device 10, the flow channel tube 20 is formed such that the sectional area of the section of the flow channel tube 20, the section being perpendicular to the tube axis of the flow channel tube 20 in the flow channel space in the flow channel tube 20, continuously decreases toward the downstream side. This maintains the laminar flow conditions for the air that flows in the flow channel tube 20.

Furthermore, in the above-described producing device 10, the plurality of flow channel tubes 20 are disposed parallel to one another, thereby preventing the size of the device from increasing. Furthermore, in the hermetically sealed container unit 12, the surface area of the flow channel tubes per flow rate of the air flowing in the flow channel tubes 20 is increased. Thus, oxygen-enriched air can be efficiently produced.

Figure 9:
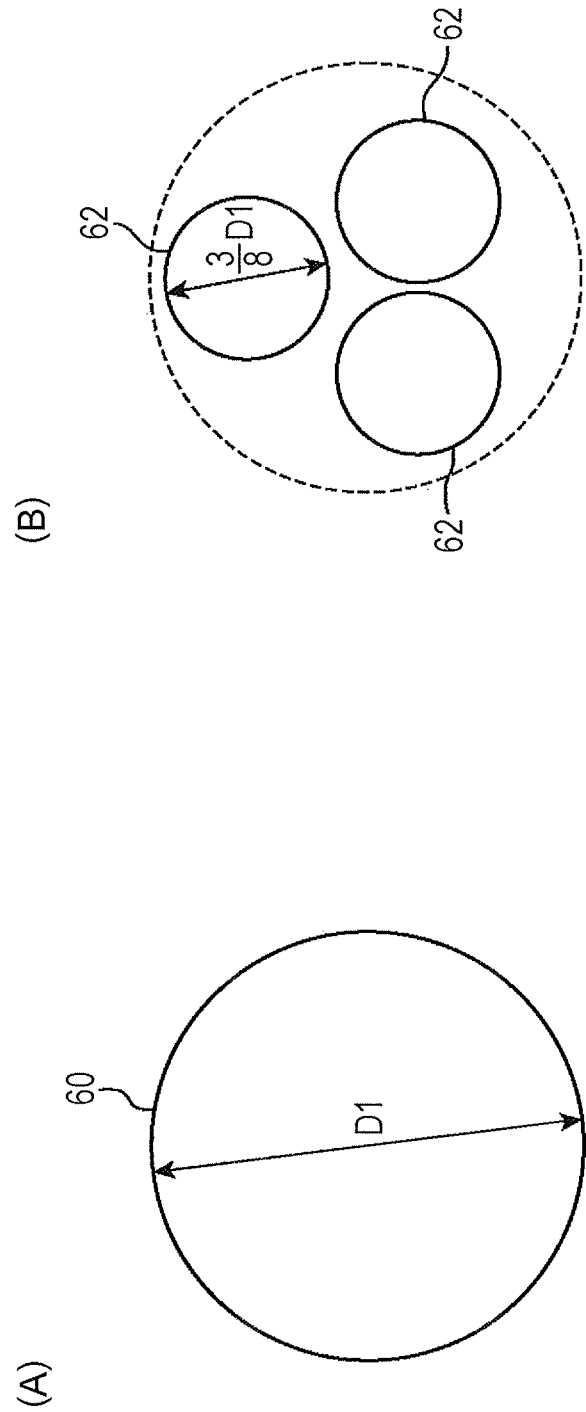
FIG. 9 is a diagram for explaining the relationship between the diameter of a piping part and the surface area.

Specifically, as illustrated in FIGS. 9 (A) and 9 (B), when a case where a piping part 60 having a diameter of D1 is disposed in a magnetic field is compared with a case where a plurality of piping parts (for example, piping parts having a diameter of (⅜)×D1) 62 are disposed in a space for disposing the piping part 60 (region indicated by a dotted circle in FIG. 9 (B)), the sum of the surface areas of the plurality of piping parts 62 is (⅜)×D1×π×3=(⅞)×D1×π while the surface area of the piping part 60 is D1×π. Thus, the surface area in the case where the plurality of piping parts are disposed in parallel is larger than that of the piping part 60. Here, as the surface area of the piping part(s) in the magnetic field increases, the amount of nitrogen (nitrogen-enriched air) extracted from the inside to outside of the piping part(s) increases. Accordingly, by arranging the plurality of flow channel tubes 20 parallel to one another, oxygen-enriched air is efficiently produced.

Furthermore, the above-described producing device 10 includes the control unit 35 that controls the air supply unit 14 and the pressure reducing unit 16 so as to maintain a region where the laminar flow conditions of the air flow in the flow channel tube 20 are satisfied. This simplifies operation of the producing device 10.

Figure 10:
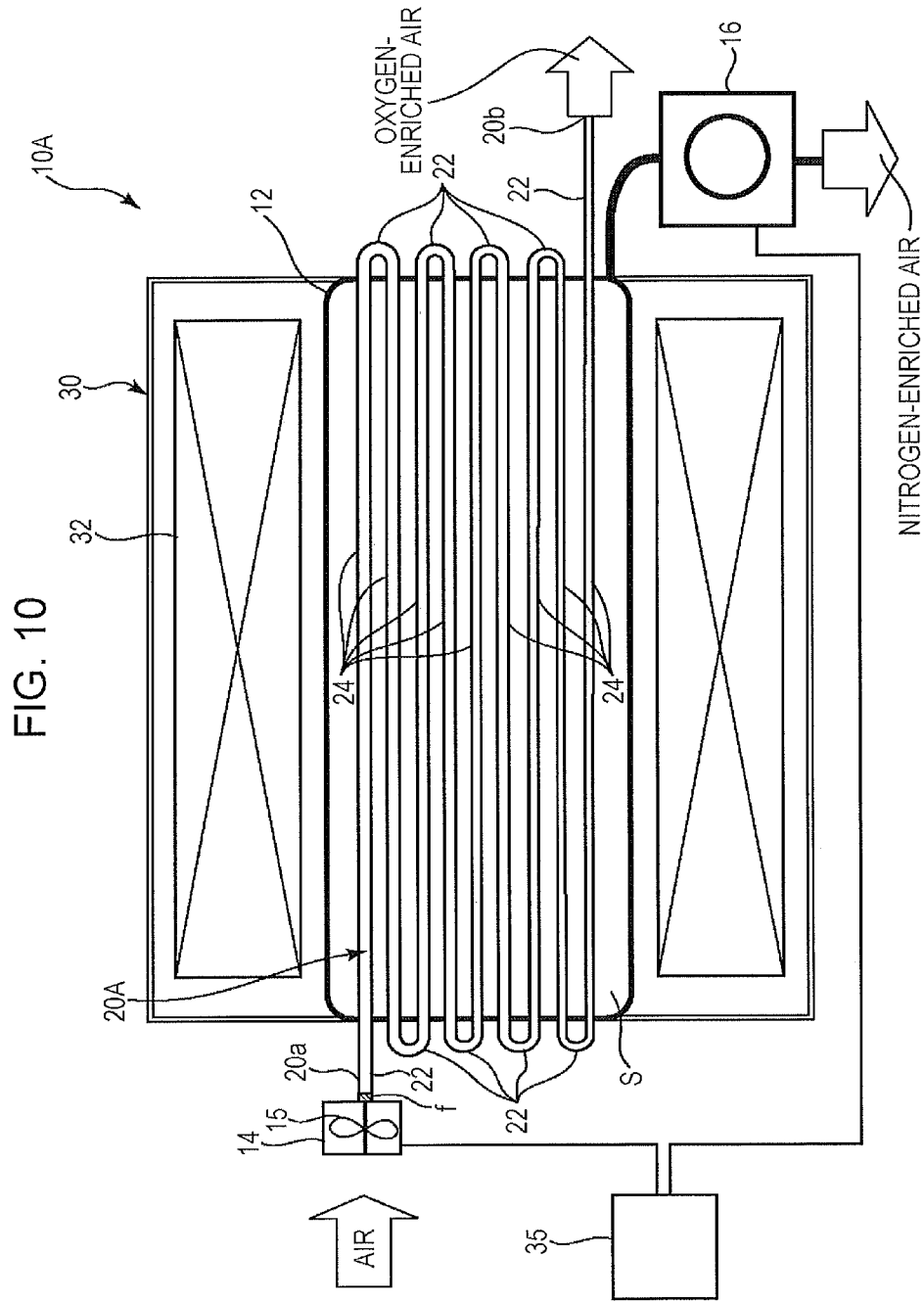
FIG. 10 is a general block diagram of an oxygen-enriched air producing device according to a second embodiment.

Next, a second embodiment according to the present invention will be described with reference to FIG. 10. Elements similar to those in the first embodiment are denoted by the same reference signs and detailed description thereof is omitted. Only elements different from those in the first embodiment are described.

The difference between a producing device 10A according to the present embodiment and the producing device 10 according to the first embodiment is that the producing device 10A includes a flow channel unit different from that of the first embodiment. Specifically, in the producing device 10A according to the present embodiment, the flow channel unit includes a single flow channel tube 20A.

The flow channel tube 20A has a plurality of (nine in the example illustrated in FIG. 10) straight-tube shaped permeation portions 24 and a plurality of (eight in an example illustrated in FIG. 10) curved-tube shaped non-permeation portions 22. The plurality of permeation portions 24 are disposed parallel to one another. The plurality of non-permeation portions 22 connect the ends of the adjacent permeation portions 24 to each other alternately on the left and right sides so that the flow channel tube 20A has a meandering shape. Each of the permeation portions 24 is formed to have a uniform inner diameter in positions thereof in the tube axis direction. Among the adjacent permeation portions 24, the inner diameter of the permeation portion 24 on the downstream side is smaller than that of the permeation portion 24 on the upstream side. Thus, in the flow channel tube 20A, the sectional area of the section perpendicular to the tube axis in the flow channel space decreases step by step toward the downstream side.

The flow channel tube 20A may be formed to have a shape in which the sectional area perpendicular to the tube axis in the flow channel space of the flow channel tube 20A continuously decreases toward the downstream side as illustrated in FIG. 2.

The filter f of the air supply unit 14 is provided between the fan 15 and the inlet portion 20a of the flow channel tube 20.

In the above-described producing device 10A, the flow channel tube 20A is disposed so as to have a meandering shape, thereby reducing the size of the device 10A. Furthermore, it is ensured that the flow channel tube 20A (permeation portions 24) in the hermetically sealed container unit 12 has a sufficient length. Thus, the amount of nitrogen exhausted to the outside of the flow channel tube 20A is increased. That is, oxygen-enriched air of higher oxygen concentration is obtained.

The oxygen-enriched air producing device and oxygen-enriched air producing method are not limited to the first and second embodiments. It is clear that a variety of changes may be made without departing from the gist of the present invention.

Figure 11:
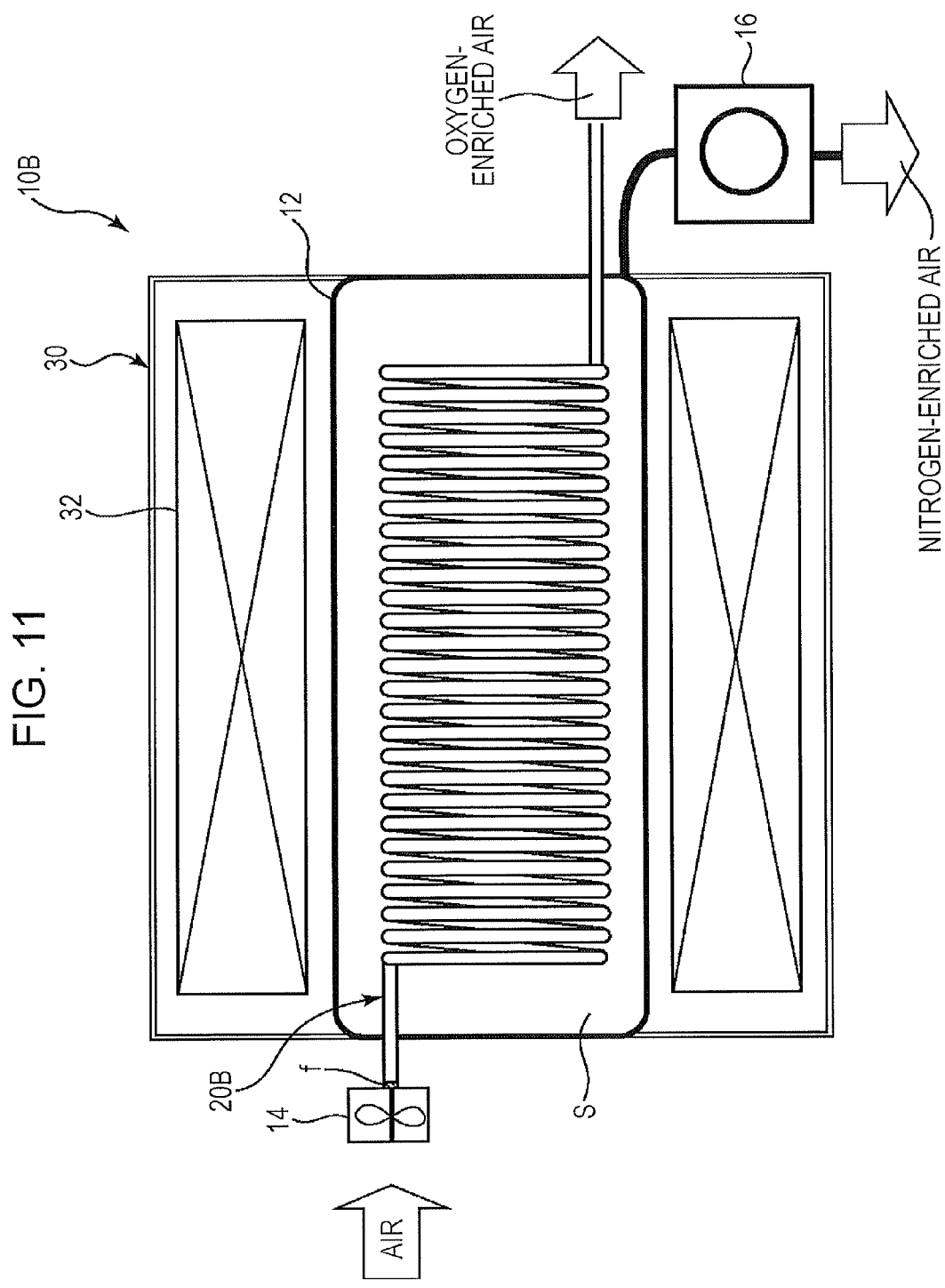
FIG. 11 is a general block diagram of an oxygen-enriched air producing device according to another embodiment.

Specific arrangement of the flow channel tube 20 is not limited. For example, although the flow channel tube 20A is disposed so as to have a meandering shape in the above-described second embodiment, the arrangement of the flow channel tube 20A is not limited to this. For example, as illustrated in FIG. 11, a flow channel tube 20B may be disposed so as to have a spiral shape. In this case, the entirety of the spiral shape portion may be disposed in the hermetically sealed container unit 12 (pressure reduction region S). Alternatively, part of the spiral shape portion may be disposed in the hermetically sealed container unit 12 (pressure reduction region 5).

In the case where the flow channel tube 20A is disposed so as to have a meandering shape, the structure of the flow channel tube 20A is not limited to that of the above-described second embodiment, in which only straight tube portions (regions corresponding the permeation portions 24 in FIG. 10) are disposed in the hermetically sealed container unit 12

(pressure reduction region S). In addition to the straight tube portions, curved portions of the flow channel tube 20A (portions that connect the permeation portions 24 to one another in FIG. 10) may also be disposed in the hermetically sealed container unit 12 (pressure reduction region S).

The entire portions of the flow channel tubes 20, or the entire portions of the flow channel tube 20A or 20B disposed in the hermetically sealed container unit 12 (pressure reduction region S) may serve as the permeation portions 24. Alternatively, some portions of the flow channel tubes 20 or part of the portions of the flow channel tube 20A or 20B disposed in the hermetically sealed container unit 12 (pressure reduction region S) may serve as the permeation portions 24.

Figure 12:
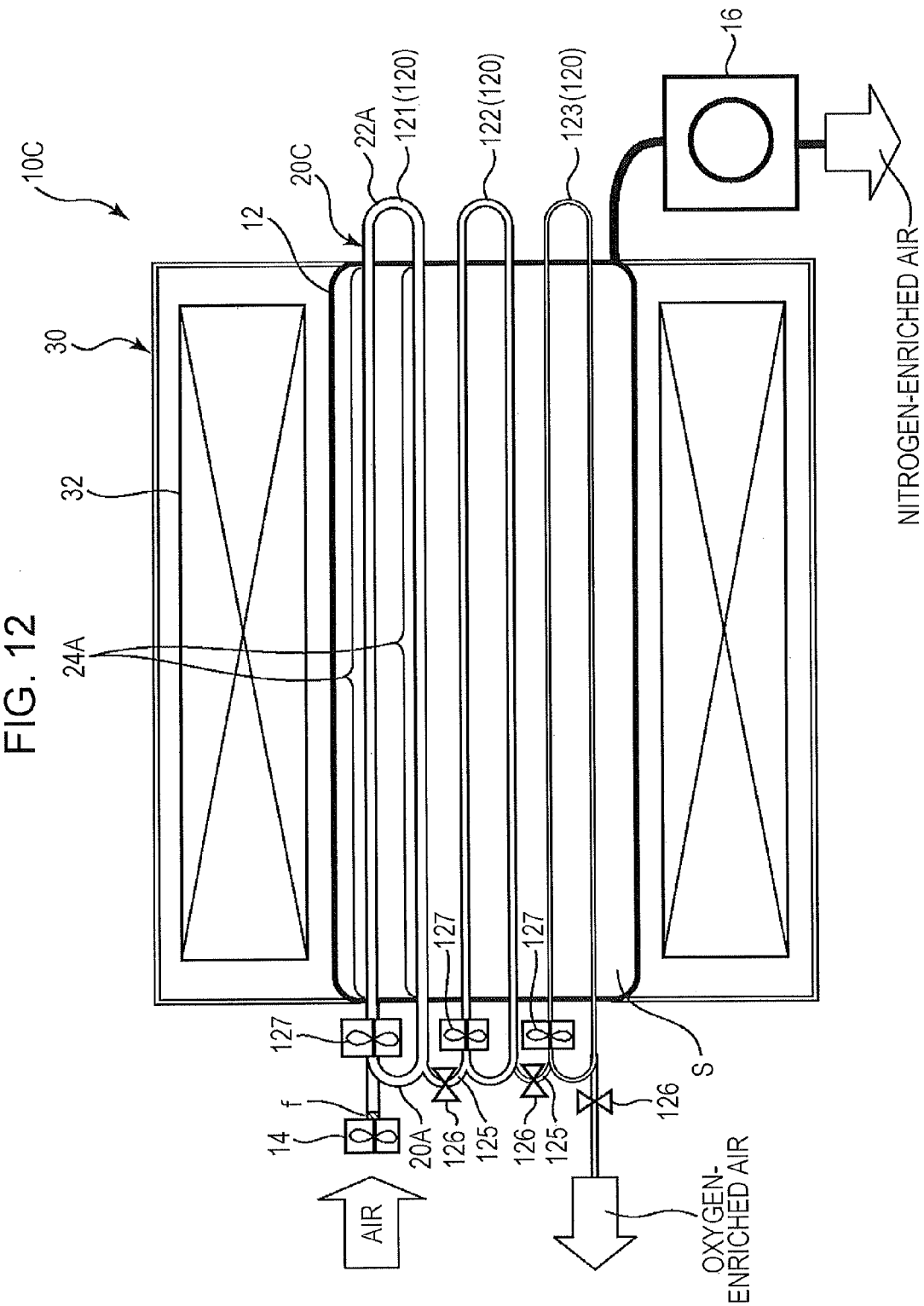
FIG. 12 is a general block diagram of an oxygen-enriched air producing device according to another embodiment.

Alternatively, as illustrated in FIG. 12, a flow channel tube 20C may have a plurality of circulation portions 120 and a plurality of connection portions 125. Air flowing inside the flow channel tube 20C circulates through the circulation portions 120. The connection portions 125 each connects adjacent circulation portions 121 and 122 to each other. In an example illustrated in FIG. 12, the flow channel tube 20C has three circulation portions, that is, the first circulation portion 121, the second circulation portion 122, and a third circulation portion 123, and two connection portions that connect the circulation portions 121 to 123 to one another. The adjacent first and second circulation portions 121 and 122 are connected to each other through the connection portion 125, and the adjacent circulation portions 122 and 123 are connected to each other through the connection portion 125. In each of the circulation portions 120, a portion disposed in the hermetically sealed container unit 12 (pressure reduction region S) is a permeation portion 24A. In each of the circulation portions 120, a portion disposed outside the hermetically sealed container unit 12 is a non-permeation portion 22A. Also, each connection portion 125 serves as a non-permeation portion. In the case where the flow channel tube 20C has a plurality of circulation portions 121, 122, and so forth as described above, a flow rate adjusting unit 126 such as a valve is provided in each connection portion 125. By adjusting the flow rate of air flowing in the connection portion 125 with the flow rate adjusting unit 126, part of the air circulated in the first circulation portion 121 is caused to flow into the second circulation portion 122 at a specified flow rate. Also, part of the air circulated in the second circulation portion 122 is caused to flow into the third circulation portion 123 at a specified flow rate. Furthermore, in order to facilitate circulation of air, a blower fan 127 is provided in each of the circulation portions 120.

When, as described above, the circulation portions 120 are provided in the flow channel tube 20C so as to circulate the air flowing in the flow channel tube 20C, the length by which the air flows in the permeation portions 24A is sufficiently increased without increasing the size of the hermetically sealed container unit 12. This improves efficiency at which nitrogen is separated.

The magnetic field forming unit 30 of the producing device 10 according to the above-described first embodiment forms a magnetic field of 10 T. Despite this, in the producing device, it is sufficient that a magnetic field of equal to or more than 3 T be formed. However, in order to more reliably produce oxygen-enriched air of a sufficient oxygen concentration in practical use, the size of a magnetic field formed by the magnetic field forming unit 30 is preferably equal to or more than 10 T. With this, the magnetic susceptibility of oxygen in the flow channel tube 20 is further increased, and accordingly, in the air flowing in the flow channel tube, oxygen is further concentrated in a region near the center (tube axis) and nitrogen is further concentrated in a region near the inner circumferential surface of the flow channel tube. As a result, nitrogen is more efficiently removed from the air.

Figure 13:
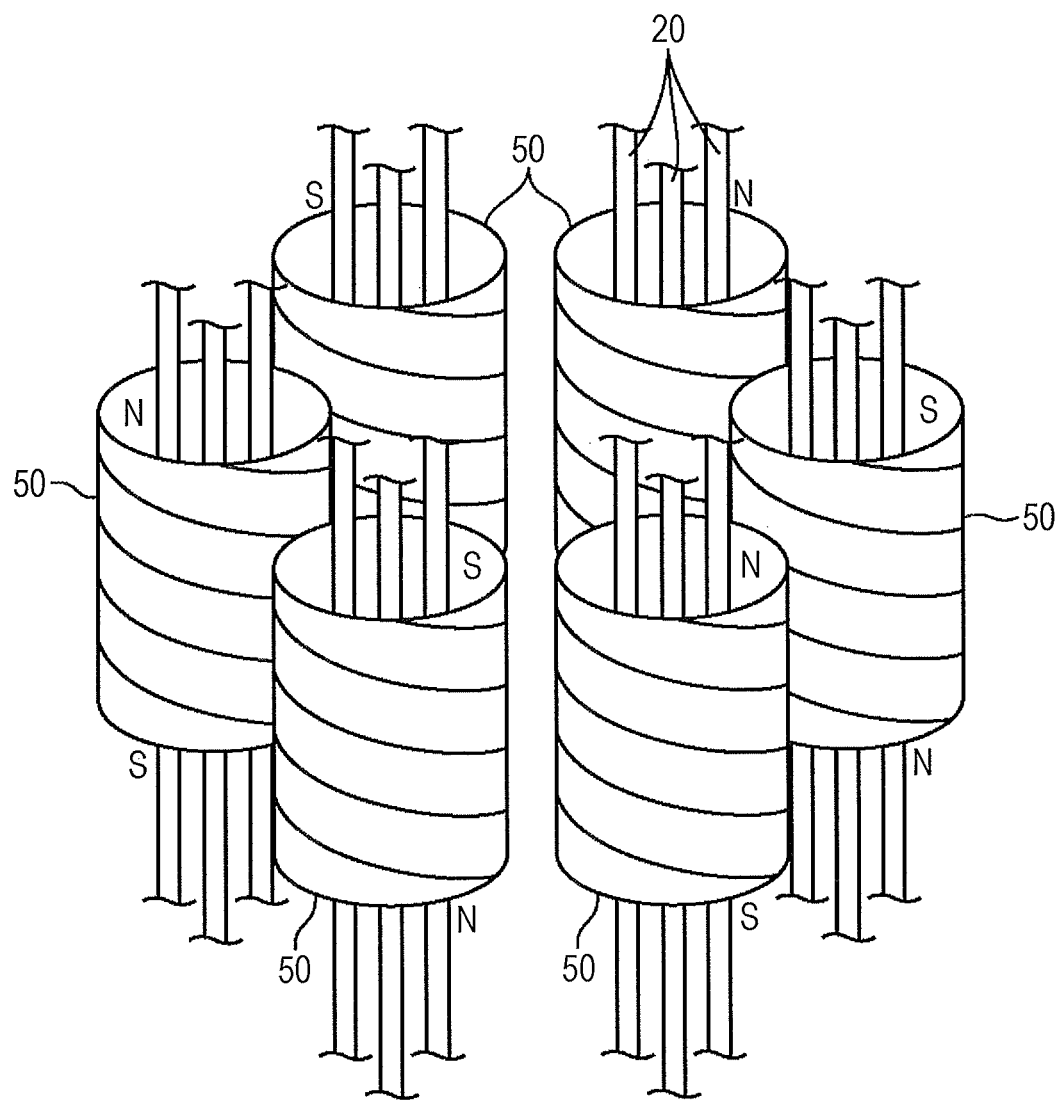
FIG. 13 is a diagram for explaining an oxygen-enriched air producing device in which a multi-pole solenoid coil is used as a magnetic field forming unit.
Figure 14:
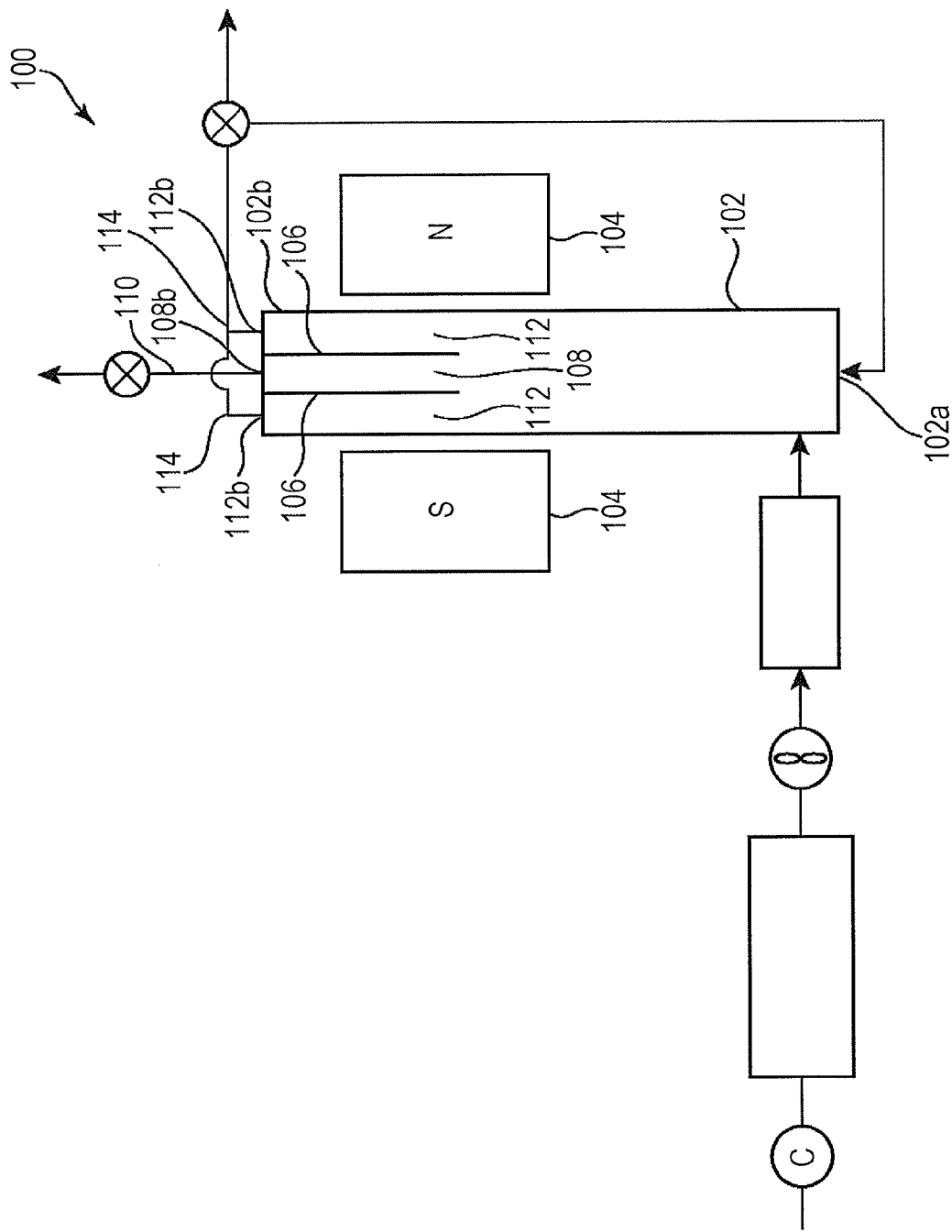
FIG. 14 is a general block diagram of a related-art oxygen-enriched air producing device that utilizes a magnetic field.

Alternatively, the magnetic field forming unit may use a multi-pole solenoid coil unit. As illustrated in FIG. 13, the multi-pole solenoid coil unit includes a plurality (six in an example in FIG. 13) of solenoid coils 50 disposed such that the axes of the solenoid coils 50 are parallel to one another and arranged on a specified circumference of a circle. The solenoid coils 50 are disposed so that the orientations of the magnetic poles of the adjacent solenoid coils 50 are opposite to each other. In this case, the flow channel tubes 20 are inserted through the solenoid coils 50. A single flow channel tube 20 or a plurality of (two or more) flow channel tubes 20 may be inserted through each solenoid coil 50.

By disposing the plurality of solenoid coils 50 as described above, fringing magnetic fields formed by the solenoid coils 50 cancel out one another, thereby suppressing magnetic fields produced outside the solenoid coils 50. That is, only by disposing the solenoid coils 50, fringing magnetic fields toward the outside of the producing device are effectively suppressed.

When a plurality of multi-pole solenoid coil units (plurality of units of the plurality of solenoid coils 50) are disposed in series with respect to the air flow direction in the flow channel tube 20, oxygen-enriched air of a higher oxygen concentration is obtained. When the plurality of multi-pole solenoid coil units (units of the plurality of solenoid coils 50) are disposed in parallel with respect to the air flow direction in the flow channel tube 20, the flow rate of oxygen-enriched air to be obtained is increased.

The flow channel tube 20A, 20B, 20C, or 20D may be provided with a flow regulating member such as a flow regulating plate that regulates the flow of air (input air) flowing therein. This flow regulating member is provided, for example, in the inlet portion 20a of the flow channel tube 20 of the first embodiment, at the upstream end of the permeation portion 24 of the flow channel tube 20A of the second embodiment, or the like.

With this structure, air flows under the laminar flow conditions in more regions including a region adjacent to the inner circumferential surface of the permeation portion 24 in the permeation portion 24. Thus, in the air flow in the permeation portion 24, oxygen is more effectively concentrated in a region near the center (tube axis). That is, nitrogen contained in the air flowing in the region adjacent to the inner circumferential surface is more effectively concentrated. As a result, nitrogen is more preferably exhausted from the air flowing in the permeation portion 24 to the outside of the permeation portion 24.

[Summary of Embodiments]

The embodiments described above are summarized as follows.

That is, an oxygen-enriched air producing device according to a form of implementation produces oxygen-enriched air, the oxygen concentration of which is higher than that of input air. The oxygen-enriched air producing device includes a hermetically sealed container unit that surrounds a specified pressure reduction region so as to hermetically seal the pressure reduction region, a flow channel tube, at least part of which extends through the hermetically sealed container unit, an air supply unit that supplies air into the flow channel tube, a pressure reducing unit that reduces pressure in the hermetically sealed container unit so that the pressure in the hermetically sealed container unit is lower than that in the flow channel tube, and a magnetic field forming unit that forms a magnetic field in the flow channel tube. In the oxygen-enriched air producing device, the flow channel tube has a region therein where the air supplied by the air supply unit flows at least under laminar flow conditions. In the oxygen-enriched air producing device, a tube wall of a pressure reduction region portion of the flow channel tube, the pressure reduction region portion being positioned in the hermetically sealed container unit, is formed of a non-magnetic material and that allows part of the air flowing in the pressure reduction region portion to pass through the tube wall to be exhausted to an outside of the pressure reduction region portion when the pressure in the hermetically sealed container unit is lower than that in the pressure reduction region portion.

An oxygen-enriched air producing method according to another form of implementation produces oxygen-enriched air, the oxygen concentration of which is higher than that of input air. The oxygen-enriched air producing method includes a step of forming a magnetic field in a flow channel tube having a tube wall, which is formed of a non-magnetic material that allows part of air flowing in the flow channel tube to pass through the tube wall to be exhausted to an outside of the flow channel tube when pressure outside the flow channel tube is lower than that in the flow channel tube, a step of supplying the air into the flow channel tube so that a region in which the air flows at least under laminar flow conditions is formed in the flow channel tube, and a step of reducing pressure that reduces the pressure outside the flow channel tube to a specified pressure.

In the above-described structure, in the flow of the air in the flow channel tube, oxygen as a paramagnetic material is moved toward the center of the flow channel tube by the magnetic field. Accordingly, the ratio of nitrogen in the air in a region adjacent to an inner circumferential surface of the flow channel tube (region in which the air flows at least under the laminar flow conditions) increases. That is, the nitrogen is concentrated in the air near the inner circumferential surface. For this reason, the pressure outside (around) the flow channel tube is reduced to a pressure lower than that in the flow channel tube, and the air near the inner circumferential surface, the air containing the concentrated nitrogen, is exhausted to the outside of the flow channel tube through the tube wall. This increases the oxygen concentration in the air remaining in the flow channel tube. Thus, oxygen-enriched air is obtained. Furthermore, with the above-described structure, an energy efficiency higher than a theoretical limit of Carnot refrigerator efficiency can be achieved. That is, with the oxygen-enriched air producing device and the oxygen-enriched air producing method, since the oxygen-enriched air is produced from room temperature air, energy efficiency is not restricted by the theoretical limit of Carnot refrigerator efficiency. For this reason, the oxygen-enriched air is produced at a lower cost than that of oxygen-enriched air produced by, for example, the cryogenic separation method.

Since the nitrogen contained in the air flowing in the flow channel tube is exhausted to the outside through the tube wall, the flow rate of this air decreases as the air advances toward the downstream side of the flow channel tube in accordance with the amount of the nitrogen having been exhausted. Thus, in the flow channel tube, in order to continue to maintain a region in which the air flows so as to satisfy the laminar flow conditions, a sectional area of a section of the flow channel tube perpendicular to a tube axis of the flow channel tube in a flow channel space, in which the air flows, in the flow channel tube is preferably reduced step-by-step or continuously toward the downstream side. Furthermore, as described above, the flow rate of the air flowing in the flow channel tube decreases in accordance with the amount of the nitrogen having been exhausted to the outside of the flow channel tube. Thus, in the flow channel tube, which has an inlet portion and an outlet portion respectively at an end from which the air is supplied and at an end on a side opposite to the inlet portion, a value of a ratio between an opening area of the inlet portion and an opening area of the outlet portion is set in accordance with the oxygen concentration of the oxygen-enriched air to be exhausted from the outlet portion.

The oxygen-enriched air producing device may include a plurality of the flow channel tubes disposed parallel to one another.

With this structure, an increase in the size of the device is prevented. Furthermore, the surface area of the flow channel tubes per flow rate of the air flowing in the flow channel tubes is increased. Thus, the oxygen-enriched air can be efficiently produced.

The flow channel tube may be disposed so as to have a spiral shape or a meandering shape, and at least part of the flow channel tube may extend through the hermetically sealed container unit.

With this structure, the size of the device can be reduced. Furthermore, it is ensured that the flow channel tube in the hermetically sealed container unit (pressure reduction region portion) has a sufficient length. Thus, the amount of nitrogen exhausted to the outside of the flow channel tube is increased.

The oxygen-enriched air producing device preferably includes a control unit that controls the air supply unit and the pressure reducing unit. In this case, the control unit causes the air supply unit and the pressure reducing unit to adjust the flow rate of the air to be supplied into the flow channel tube and the pressure in the hermetically sealed container unit, respectively, so that a region in which the air flows at least under the laminar flow conditions is formed in the flow channel tube and so that a flow velocity gradient of the air in the region adjacent to the inner circumferential surface of the flow channel tube is uniform.

With this structure, by controlling the air supply unit and the pressure reducing unit with the control unit, a region in which the air flows so as to satisfy the laminar flow conditions in the air flow in the flow channel tube is maintained. Thus, operation of the device can be simplified.

In the oxygen-enriched air producing device, the magnetic field forming unit forms the magnetic field of equal to or more than 3 T in the pressure reduction region portion. Thus, the oxygen-enriched air is preferably produced from the air (input air). That is, by forming the magnetic field of equal to or more than 3 T, the magnetized oxygen is concentrated in a region near the center (tube axis) in the air flow in the flow channel tube, thereby concentrating the nitrogen in a region near the inner circumferential surface of the flow channel tube. When this nitrogen-enriched air is exhausted to the outside of the flow channel tube, the oxygen concentration of the air flowing in the flow channel tube is improved.

In the oxygen-enriched air producing device, the magnetic field forming unit may include a plurality of solenoid coils. In this case, the plurality of solenoid coils are disposed such that the axes of the solenoid coils are parallel to one another and arranged on a specified circumference of a circle, orientations of magnetic poles of the adjacent solenoid coils are opposite to each other, and the flow channel tube is inserted through the solenoid coils.

By disposing the plurality of solenoid coils as described above, fringing magnetic fields formed by the solenoid coils cancel out one another. This suppresses magnetic fields produced outside the solenoid coils. That is, only by disposing the solenoid coils, fringing magnetic fields toward the outside of the device are effectively suppressed.

In the oxygen-enriched air producing device, the tube wall in the pressure reduction region portion may be formed of a material having permeability to nitrogen higher than its permeability to oxygen.

With this structure, exhaustion of the oxygen in the air flowing in the flow channel tube to the outside of the flow channel tube is suppressed while more effectively exhausting the nitrogen in the air to the outside of the flow channel tube.

The flow channel tube may have a flow regulating member that regulates the air flow flowing therein.

With this structure, air flows so as to satisfy the laminar flow conditions in more regions including the region adjacent to the inner circumferential surface of the flow channel tube in the flow channel tube. Thus, in the air flow in the flow channel tube, oxygen is more effectively concentrated in a region near the center (tube axis). That is, the nitrogen contained in the air flowing in the region adjacent to the inner circumferential surface is more effectively concentrated. As a result, nitrogen is more preferably exhausted from the air flowing in the flow channel tube to the outside of the flow channel tube.

The present application is based on Japanese Patent Application No. 2011-112342 filed May 19, 2011, the contents of which are incorporated herein.

In order to express the present invention, in the above description, the present invention has been adequately and sufficiently described by means of the embodiments with reference to the drawings. It is to be understood that one skilled in the art can easily change and/or improve the above-described embodiments. Accordingly, it should be understood that, as long as the levels of a changed form or an improved form made by one skilled in the art are not departing from the scope of the rights of the claims described in the claims, the changed form or the improved form are included in the scope of the rights of the claims.

Industrial Applicability

The present invention provides an oxygen-enriched air producing device and an oxygen-enriched air producing method.

The invention claimed is:

1. An oxygen-enriched air producing device that produces oxygen-enriched air, an oxygen concentration of the oxygen-enriched air being higher than that of input air, the oxygen-enriched air producing device comprising:
a hermetically sealed container unit that surrounds a specified pressure reduction region so as to hermetically seal the pressure reduction region;
a flow channel tube, at least part of the flow channel tube extending through the hermetically sealed container unit;
an air supply unit that supplies air into the flow channel tube;
a pressure reducing unit that reduces pressure in the hermetically sealed container unit so that the pressure in the hermetically sealed container unit is lower than that in the flow channel tube; and
a magnetic field forming unit that forms a magnetic field in the flow channel tube,
wherein the flow channel tube has a region therein where the air supplied by the air supply unit flows at least under laminar flow conditions, and
wherein a tube wall of a pressure reduction region portion of the flow channel tube, the pressure reduction region portion being positioned in the hermetically sealed container unit, is formed of a non-magnetic material that allows part of the air flowing in the pressure reduction region portion to pass through the tube wall to be exhausted to an outside of the pressure reduction region portion when the pressure in the hermetically sealed container unit is lower than that in the pressure reduction region portion.

2. The oxygen-enriched air producing device according to claim 1,
wherein a sectional area of a section of the flow channel tube perpendicular to a tube axis of the flow channel tube in a flow channel space, the air flowing in the flow channel space, in the flow channel tube is reduced step-by-step or continuously toward a downstream side.

3. The oxygen-enriched air producing device according to claim 1,
wherein the flow channel tube has an inlet portion and an outlet portion at an end from which the air is supplied and at an end on a side opposite to the inlet portion, respectively, and a ratio between an opening area of the inlet portion and an opening area of the outlet portion is a value set in accordance with the oxygen concentration of the oxygen-enriched air to be exhausted from the outlet portion.

4. The oxygen-enriched air producing device according to claim 1,
wherein a plurality of the flow channel tubes are provided, and the flow channel tubes are disposed parallel to one another.

5. The oxygen-enriched air producing device according to claim 1,
wherein the flow channel tube is disposed so as to have a spiral shape or a meandering shape, and at least part of the flow channel tube extends through the hermetically sealed container unit.

6. The oxygen-enriched air producing device according to claim 1, further comprising:
a control unit that controls the air supply unit and the pressure reducing unit,
wherein the control unit causes the air supply unit and the pressure reducing unit to adjust a flow rate of the air to be supplied into the flow channel tube and the pressure in the hermetically sealed container unit, respectively, so that a region in which the air flows at least under the laminar flow conditions is formed in the flow channel tube and so that a flow velocity gradient of the air in a region adjacent to an inner circumferential surface of the flow channel tube is uniform.

7. The oxygen-enriched air producing device according to claim 1,
wherein the magnetic field forming unit forms the magnetic field of equal to or more than 3 T in the pressure reduction region portion.

8. The oxygen-enriched air producing device according to claim 1,
wherein the magnetic field forming unit includes a plurality of solenoid coils,
wherein the plurality of solenoid coils are disposed such that axes of the solenoid coils are parallel to one another and arranged on a specified circumference of a circle, and orientations of magnetic poles of the adjacent solenoid coils are opposite to each other, and
wherein the flow channel tube is inserted through the solenoid coils.

9. The oxygen-enriched air producing device according to claim 1,
wherein the tube wall in the pressure reduction region portion is formed of a material having permeability to nitrogen higher than permeability to oxygen thereof.

10. The oxygen-enriched air producing device according to claim 1, wherein the flow channel tube has a flow regulating member that regulates the air flow flowing therein.

11. An oxygen-enriched air producing method for producing oxygen-enriched air, an oxygen concentration of the oxygen-enriched air being higher than that of input air, the oxygen-enriched air producing method comprising:
   a step of forming a magnetic field in a flow channel tube having a tube wall, the tube wall being formed of a non-magnetic material that allows part of air flowing in the flow channel tube to pass through the tube wall to be exhausted to an outside of the flow channel tube when pressure outside the flow channel tube is lower than that in the flow channel tube;
   a step of supplying the air into the flow channel tube so that a region in which the air flows at least under laminar flow conditions is formed in the flow channel tube; and
   a step of reducing pressure that reduces the pressure outside the flow channel tube to a specified pressure.

12. The oxygen-enriched air producing device according to claim 2,
   wherein a plurality of the flow channel tubes are provided, and the flow channel tubes are disposed parallel to one another.

13. The oxygen-enriched air producing device according to claim 3,
   wherein a plurality of the flow channel tubes are provided, and the flow channel tubes are disposed parallel to one another.

\* \* \* \* \*